(12) United States Patent
Gabara

(10) Patent No.: US 9,965,140 B2
(45) Date of Patent: May 8, 2018

(54) METHOD AND APPARATUS OF A MARKING OBJECTS IN IMAGES DISPLAYED ON A PORTABLE UNIT

(75) Inventor: Thaddeus John Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 1171 days.

(21) Appl. No.: 13/337,252

(22) Filed: Dec. 26, 2011

(65) Prior Publication Data

US 2013/0162626 A1 Jun. 27, 2013

(51) Int. Cl.
| G06T 15/00 | (2011.01) |
| G06F 3/0481 | (2013.01) |
| G06T 17/05 | (2011.01) |
| G06F 3/147 | (2006.01) |
| G06F 3/0484 | (2013.01) |
| G06F 3/0485 | (2013.01) |
| G06F 3/0488 | (2013.01) |
| G06F 3/0489 | (2013.01) |

(52) U.S. Cl.
CPC ........ G06F 3/04812 (2013.01); G06F 3/0485 (2013.01); G06F 3/0489 (2013.01); G06F 3/04815 (2013.01); G06F 3/04842 (2013.01); G06F 3/04845 (2013.01); G06F 3/04886 (2013.01); G06F 3/147 (2013.01); G06T 17/05 (2013.01); *G06F 2203/04802* (2013.01); *G06F 2203/04803* (2013.01); *G06F 2203/04804* (2013.01); *G06F 2203/04806* (2013.01); *G09G 2340/0407* (2013.01); *G09G 2340/10* (2013.01); *G09G 2340/145* (2013.01)

(58) Field of Classification Search
CPC ........ G06T 17/05; G06T 19/003; G06F 3/147
USPC .......................................... 345/419, 427, 592
See application file for complete search history.

(56) References Cited

U.S. PATENT DOCUMENTS

| 5,311,203 A | 5/1994 | Norton |
| 5,590,261 A | 12/1996 | Sclarroff et al. |
| 5,638,523 A * | 6/1997 | Mullet et al. ................. 715/855 |

(Continued)

OTHER PUBLICATIONS

Henze, N., & Boll, S., (Sep. 2010), "Push the study to the app store: Evaluating off-screen visualizations for maps in the android market," Proceedings of the 12th international conference on Human computer interaction with mobile devices and services, pp. 373-374, ACM.*

(Continued)

*Primary Examiner* — Kimbinh T Nguyen
(74) *Attorney, Agent, or Firm* — Tyrean Patent Prosecution Law Firm

(57) ABSTRACT

Location markers are placed on objects presented on a display screen. The location markers can be letters, numbers, or shapes placed near the desired objects to be viewed. After magnification, those earlier determined location markers of the display screen are located off-screen. However, arrows are labeled and point to the off-screen markers. The user moves the background image in the direction of the arrow to find that object. This innovative technique allows the user to mark locations, magnify the image of the map, and find all marked locations (without reverting to a lower magnification) by following pointers that direct the user to locations that are currently out of view of the screen. Furthermore, the user can find all marked locations without getting lost.

16 Claims, 40 Drawing Sheets

(56) References Cited

U.S. PATENT DOCUMENTS

| | | | |
|---|---|---|---|
| 5,678,546 A | 10/1997 | Truppe | |
| 5,815,411 A | 9/1998 | Ellenby et al. | |
| 6,169,552 B1* | 1/2001 | Endo | G01C 21/32 345/419 |
| 6,243,713 B1 | 6/2001 | Nelson et al. | |
| 6,278,449 B1 | 8/2001 | Sugiarto et al. | |
| 6,346,942 B1* | 2/2002 | Endo | G01C 21/3635 345/427 |
| 6,493,630 B2* | 12/2002 | Ruiz et al. | 701/532 |
| 6,584,220 B2 | 6/2003 | Lantrip et al. | |
| 6,594,406 B1 | 7/2003 | Hecht | |
| 6,597,818 B2 | 7/2003 | Kumar et al. | |
| 6,654,014 B2* | 11/2003 | Endo | G01C 21/3635 345/427 |
| 6,920,392 B2 | 7/2005 | Adachi | |
| 7,353,108 B2 | 4/2008 | Adachi | |
| 7,543,758 B2 | 6/2009 | Dymetman et al. | |
| 7,714,880 B2* | 5/2010 | Johnson | G06F 1/1626 345/156 |
| 7,765,261 B2 | 7/2010 | Kropivny | |
| 7,861,180 B2 | 12/2010 | Liu et al. | |
| 7,885,981 B2 | 2/2011 | Kaufman et al. | |
| 7,923,909 B2* | 4/2011 | Tinwell | 313/141 |
| 8,056,019 B2 | 7/2011 | Borchardt et al. | |
| 8,015,259 B2 | 9/2011 | Swahn | |
| 8,130,244 B2 | 3/2012 | Cooper | |
| 8,217,997 B2 | 7/2012 | Solomon et al. | |
| 8,549,395 B2 | 10/2013 | Graves et al. | |
| 8,743,110 B2* | 6/2014 | Seo | 345/419 |
| 2005/0086597 A1 | 4/2005 | Duperrouzel et al. | |
| 2006/0090136 A1 | 4/2006 | Miller et al. | |
| 2006/0117269 A1 | 6/2006 | Lai et al. | |
| 2006/0274269 A1 | 12/2006 | Koest | |
| 2007/0256026 A1* | 11/2007 | Klassen et al. | 715/764 |
| 2008/0232695 A1* | 9/2008 | Noda et al. | 382/224 |
| 2008/0288644 A1 | 11/2008 | Gilfix et al. | |
| 2008/0291217 A1* | 11/2008 | Vincent et al. | 345/629 |
| 2009/0006338 A1 | 1/2009 | Ives et al. | |
| 2009/0043814 A1 | 2/2009 | Faris et al. | |
| 2009/0169060 A1* | 7/2009 | Faenger | G09B 29/007 382/113 |
| 2009/0174714 A1 | 7/2009 | Nagakura | |
| 2009/0265611 A1 | 10/2009 | Sengamedu et al. | |
| 2009/0273601 A1* | 11/2009 | Kim | 345/419 |
| 2009/0305682 A1 | 12/2009 | Spalink | |
| 2010/0115459 A1* | 5/2010 | Kinnunen et al. | 715/785 |
| 2010/0123737 A1* | 5/2010 | Williamson et al. | 345/672 |
| 2010/0188503 A1* | 7/2010 | Tsai et al. | 348/142 |
| 2010/0299615 A1 | 11/2010 | Miluzzo et al. | |
| 2011/0060998 A1 | 3/2011 | Schwartz et al. | |
| 2012/0122574 A1 | 5/2012 | Fitzpatrick et al. | |
| 2012/0192107 A1 | 7/2012 | Kwon | |
| 2013/0036347 A1 | 2/2013 | Eftekhari et al. | |

OTHER PUBLICATIONS

Burigat, Stefano, Luca Chittaro, and Silvia Gabrielli, "Visualizing locations of off-screen objects on mobile devices: a comparative evaluation of three approaches," Proceedings of the 8th conference on Human-computer interaction with mobile devices and services, pp. 239-246, ACM, Sep. 2006.*

Chittaro, Luca, and Stefano Burigat., "3D location-pointing as a navigation aid in Virtual Environments," Proceedings of the working conference on Advanced visual interfaces, 8 pages ACM, May 2004.*

Henze, N., & Boll, S., (Sep. 2010), "Evaluation of an off-screen visualization for magic lens and dynamic peephole interfaces," Proceedings of the 12th international conference on Human computer interaction with mobile devices and services, pp. 191-194, ACM.*

Mulloni, Alessandro, et al., "Zooming interfaces for augmented reality browsers," Proceedings of the 12th international conference on Human computer interaction with mobile devices and services, pp. 161-170, ACM, Sep. 2010.*

Rohs, Michael, et al., "Map navigation with mobile devices: virtual versus physical movement with and without visual context," Proceedings of the 9th international conference on Multimodal interfaces, pp. 146-153, ACM, Nov. 2007.*

U.S. Appl. No. 12/781,640, Constance Gabara.
U.S. Appl. No. 13/109,982, Constance Gabara.
U.S. Appl. No. 11/559,687, Constance Gabara.
U.S. Appl. No. 12/695,176, Quinton Gabara.
U.S. Appl. No. 11/559,700, Constance Gabara.
U.S. Appl. No. 11/952,963, Thaddeus Gabara.
Brown, Leonard D. and Hong Hua. "Magic lenses for augmented virtual environments." Computer Graphics and Applications; IEEE 26.4 (2006): 64-73.

* cited by examiner

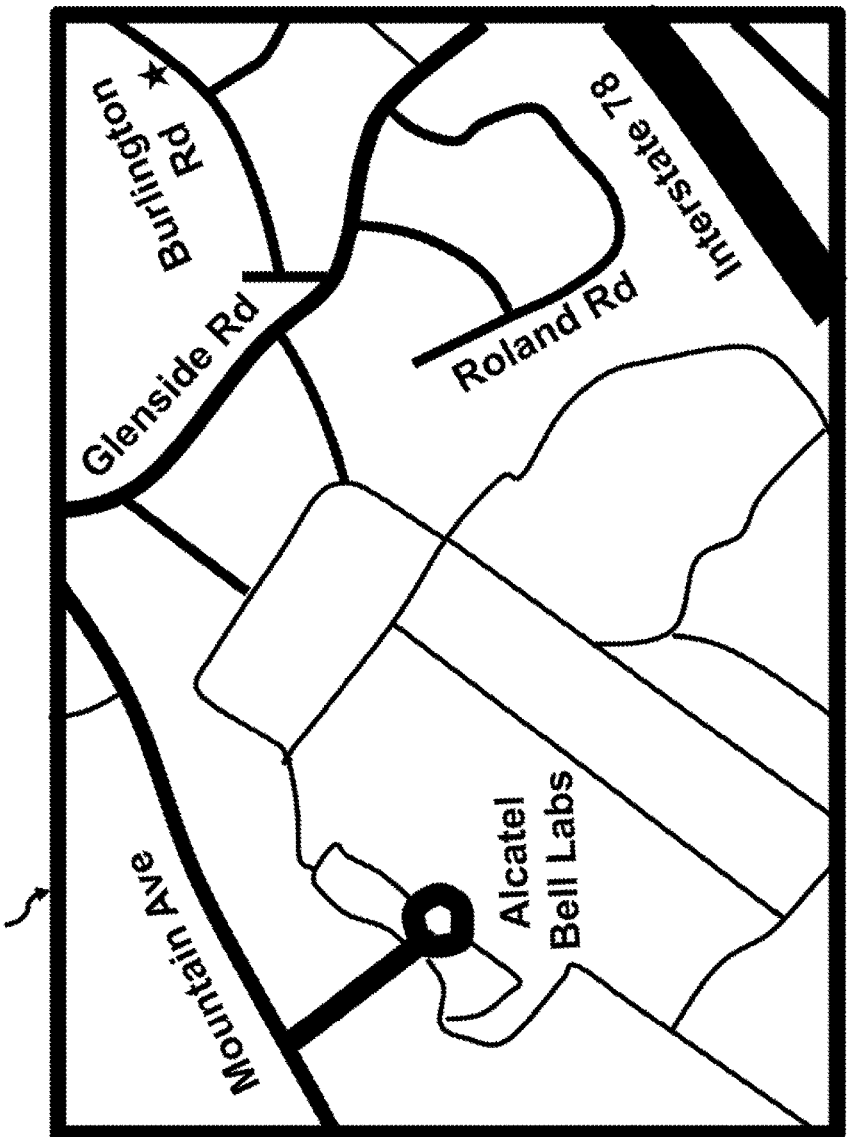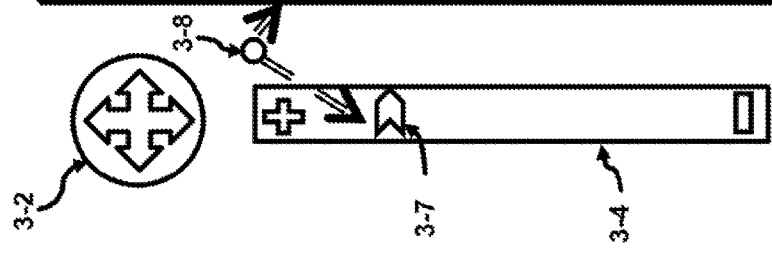
FIG. 3b

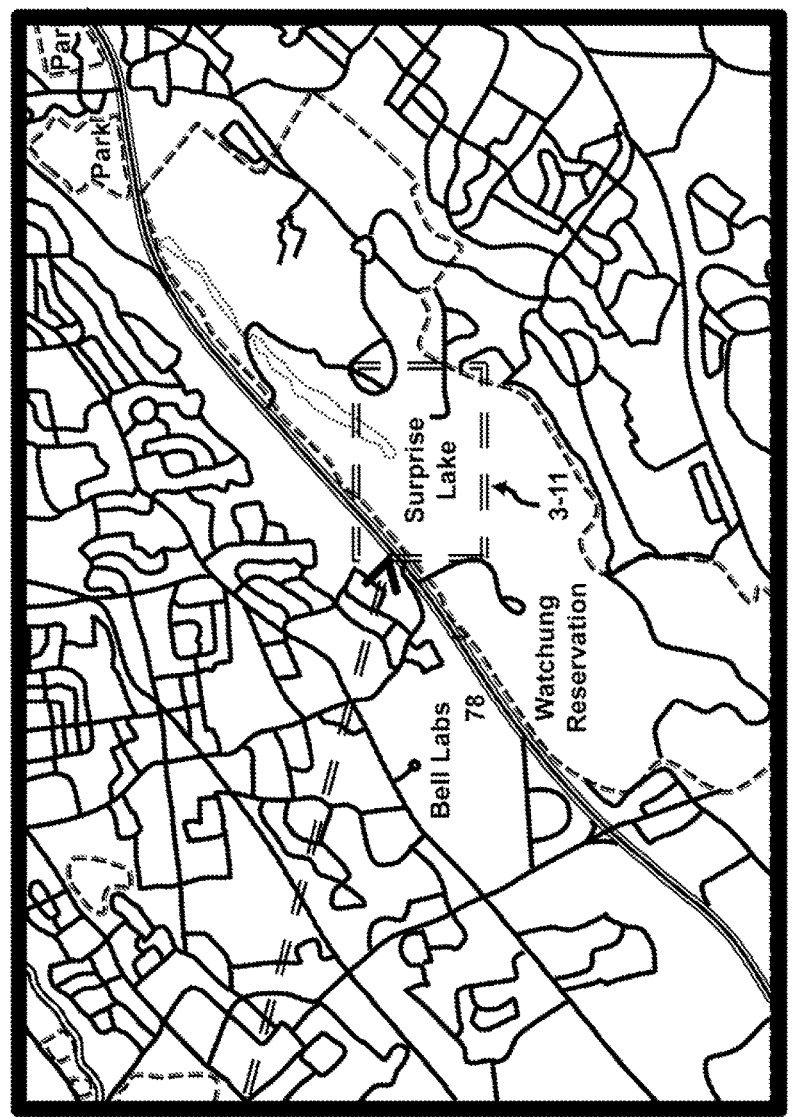
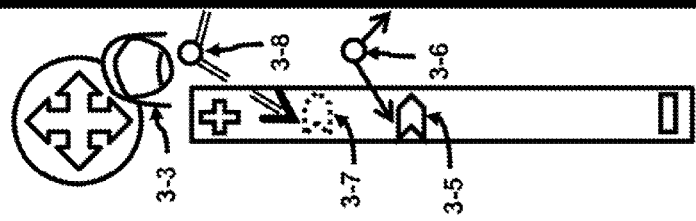
FIG. 3d

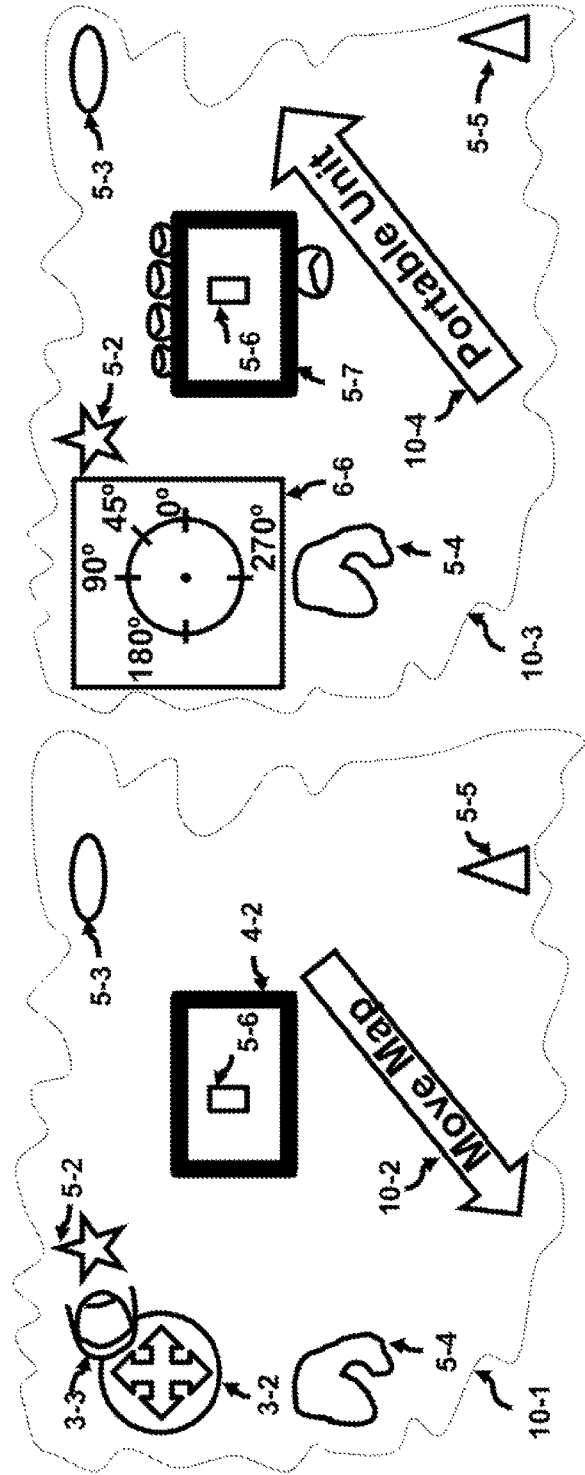

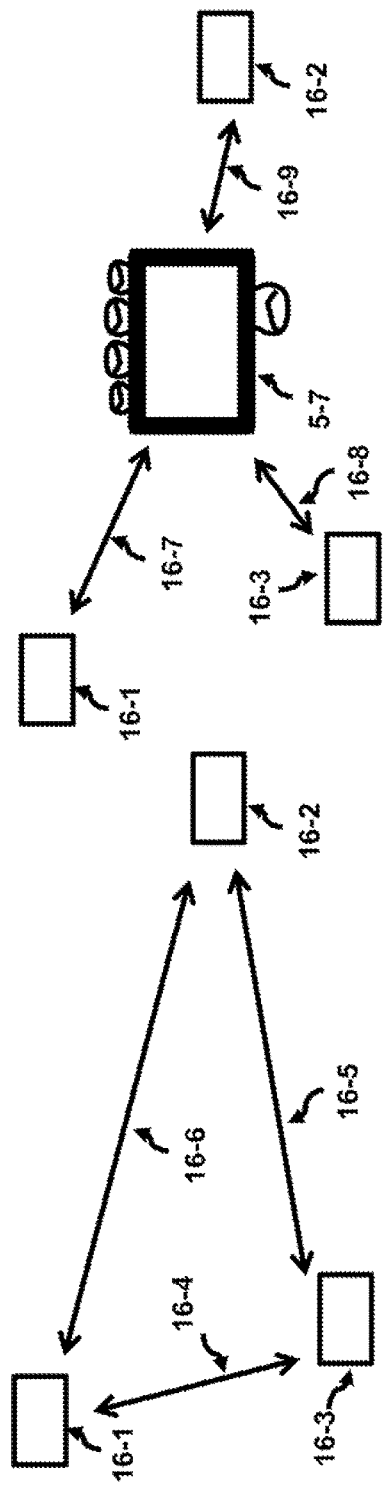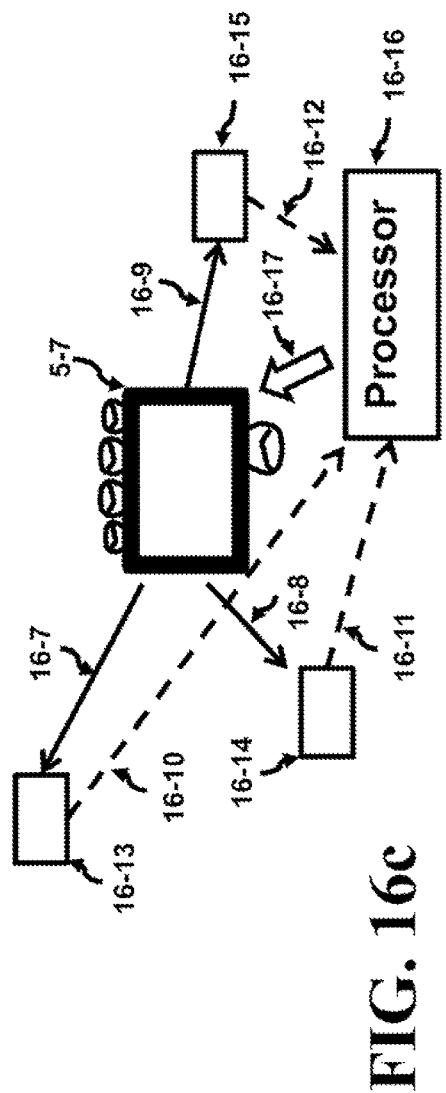
FIG. 16a
FIG. 16b
FIG. 16c

METHOD AND APPARATUS OF A MARKING OBJECTS IN IMAGES DISPLAYED ON A PORTABLE UNIT

CROSS REFERENCE TO RELATED APPLICATIONS

The present application is related to the co-filed U.S. application entitled "Method and Apparatus for Identifying a 3-D Object from a 2-D Display of a Portable Unit" filed on Dec. 26, 2011 with Ser. No. 13/337,253 and the co-filed U.S. application entitled "Method and Apparatus of Physically Moving a Portable Unit to View an Image of a Stationary Map" filed on Dec. 26, 2011 with Ser. No. 13/337,251, which are all invented by the at least one common inventor as the present application and are all incorporated herein by reference in their entireties.

BACKGROUND OF THE INVENTION

Handheld units or portable devices such as cell phones, smart phones, iPads, Kindles, Blackberries, Navigation devices (Magellan or Garmin) and Android systems offer the ability to use location assistant devices such as maps. Maps online are provided by Google, Yahoo!Maps, MapQuest Maps and Bing Maps. When a user of the portable device uses maps, the map can be scrolled by using a button control or a touch screen. The touch screen buttons can adjust direction of map movement and can scale the image on the screen. For example, when using the touch screen two fingers sliding toward each other decreases the scale while sliding the two fingers sliding apart magnifies the scale. Both types of control offer the same results. In addition, some of these commands can be made by speaking where an on-board voice recognition unit can interpret the voice of the user and comply. When the destination is viewed and an item of interest may be outside of the range of the screen of the hand handheld unit, one must scale down (minimize) the screen to get a bearing of where this particular item of interest is with respect to the initial requested destination. However, at times, that scaled down map eliminates detail forcing the user to scale up (magnify) the map to reveal more detail of the map on the screen or display of the portable unit. These minimization and magnification processes may cause the user to lose bearing, particularly since the distance between locations is difficult to sense from scrolling the map across the screen of a portable device. This invention helps to overcome this shortcoming in current portable systems for providing map directions and offer several other advantages as well.

BRIEF SUMMARY OF THE INVENTION

Various embodiments and aspects of the inventions will be described with reference to details discussed below, and the accompanying drawings will illustrate the various embodiments. Some diagrams are not drawn to scale. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

One of the embodiments of the disclosure introduces a background map that remains stationary. It is the portable unit that moves within a plane parallel to the screen of the portable unit.

As the user moves the unit, images of the background map appear on the screen of the portable device. The user scans the stationary map presented on the screen of a moving portable unit. This has several benefits since now relative distances and angular displacements between objects that are outside of the range of the screen of the portable unit can be immediately located and placed into view on the screen of a portable unit. The unit is moved through space to a physical position that has the coordinates of distance and angle from an origin or reference point. The distance and angle are used by the system to calculate the portion of the stationary map that would be visible on the screen of the portable unit. The handheld or portable unit is like a Sliding Window which provides a view of this image of a stationary map lying in the background of the portable unit. The image on the screen of the portable unit is comprised of a number of points or pixels.

Current processors are being clocked at 1 billion cycles per second and faster. In addition, there are special purpose accelerators for video applications. The calculations for the Sliding Window mode should be able to run in real time displaying images on the screen of the portable device as the device is moved. Due to the superior performance, as the user moves the portable unit, the appropriate portion of the stationary image of the map appears on the screen. The image on the screen and the stationary background image are effectively superimposed over one another. Thus, the user assesses the relative distance between a source location and a destination location and because the user moved the portable unit to view the destination location, the user can feel or relate to the distance because of the physical motion. And it is not only the relative distance that is available, but it's also the orientation or movement at an angle of the handheld unit that provides further information about the content of the image.

Another one of the embodiments of the disclosure introduces a way of initializing the handheld device to enter the Siding Window function. For example, a tilt and a shift of the handheld unit can indicate to the handheld unit to enter the Sliding Window mode. Another method is by voice command by stating "Sliding Window mode". Finally, a button (on a screen or a physical one on the unit) can be depressed to enter the Sliding Window mode.

A further embodiment is to mark an area of interest on the screen of a portable device. Each interesting location on the screen is marked by a transparent flag or marker. Then, when the user scales up (magnifies the image) the map to view one of the locations, transparent arrows are placed on the screen identified with transparent location markers indicating the direction the user needs to move to arrive at the remaining desired locations marked by markers. In this embodiment, either the portable unit can be moved while the map remains stationary or the device remains stationary while the map is moved by the touch screen. By following the transparent arrow, which constantly calculates the new direction as movement occurs, the user arrives at the desired location, often in a shortest distance, without getting lost. Once this location is viewed, the user can then proceed to follow a second transparent arrow corresponding to a second desired location. This can be done for each marked location without changing the scale or entering new data since all transparent arrows (markers) can be shown on the screen. An option can exist where the user moves to the marked location immediately by issuing a verbal or physical command.

Another embodiment is to view a stationary three dimensional (3-D) background image by moving the handheld unit within a three dimensional (3-D) space. The map would be three dimensional and would correspond in scale to the display screen of the portable unit. The third dimensional can be viewed by moving the device perpendicular to the plane of the screen of the portable device forming a rectangular cuboid (in addition, this angle can be different than 90°). Thus, slices of the volume of the 3-D image are viewed. The user can view the map in the XY plane, XZ plane, YZ plane or any angled plane between these three axes.

Another embodiment is to view a three dimensional (3-D) background image by moving the background image of a movable map on the screen of a stationary portable unit. The touch screen can be used to move the image in two dimensions corresponding to the plane of the screen. The third dimension would be perpendicular or at some angle from the handheld unit within a three dimensional (3-D) space. The third dimensional can be viewed by moving the map perpendicular to the plane of the screen of the portable device, by a temperature scale or touching a transparent tail or head. Thus, slices or cross sections, of the volume of the 3-D image are viewed on the screen. The user can integrate the cross sectional images to determine the solid. The user can view the map in the XY plane, XZ plane, YZ plane or any angled plane between these three axes.

One embodiment of such a Sliding Window can be used viewing 3-D maps of streets, geographical locations, and locations within buildings and rooms. The physical interaction of the user with the map provides a freedom of motion and interaction with the image of a stationary map which earlier technologies could not provide. This aspect can be used in other programs that may be useful for entertainment, business, and leisure.

Another embodiment relates to a portable unit comprising: a screen displaying a map at a first scale; a plurality of locations in the map are marked by location markers; the map is set to a second scale; at least one location marker is not displayed on the screen; and a transparent arrow points in a direction to each missing location marker, further comprising: the transparent arrow identifies the identity of each missing location marker. The portable unit further comprising: an image of the map mapping onto a two dimensional plane, further comprising: an origin mapped to a point on the image of the map, further comprising: an X-axis mapped to a line on the image of the map, further comprising: a microprocessor calculates an angle of the direction of each transparent arrow points using software. The portable unit further comprising: a memory to store the image of a map; and an RF module to access an external database to supply the memory with data.

Another embodiment relates to a portable unit comprising: a screen displaying a map on a first plane; a plurality of locations in the map are marked by location markers; the map is moved displaying a new portion of the map on the screen; at least one location marker is not displayed on the screen; and a transparent arrow points to each missing location marker, further comprising: an image of the map maps into a three dimensional space, further comprising: an origin mapped to any three dimensional point within an image of the map representing the three dimensional space, further comprising: an X-axis mapped to a line in an image of the map. The portable unit further comprising: a microprocessor to calculate a projected angle of each transparent arrow on the first plane, further comprising: a transparent head with a diameter proportion to a height above the first plane of each missing location marker; and a transparent tail with a diameter proportion to a depth below the first plane of each missing location marker, further comprising: a memory to store an image of the map; and an RF module to access an external database to supply the memory with data.

Another embodiment relates to a method of moving a portable unit by a distance to display a new location comprising the steps of: displaying a map on a first plane of a screen; marking a plurality of locations in the map by location markers; displaying a new portion of the map when the map is moved, whereby at least one location marker is not displayed on the screen; and a transparent arrow points to each missing location marker, further comprising the steps of: mapping an image of the map within a three dimensional space. The process further comprising the steps of: mapping an origin to a point within the image of the map representing the three dimensional space. The process further comprising the steps of: calculating a projected angle of each transparent arrow on the first plane by a microprocessor, further comprising the steps of: displaying a transparent head with a diameter proportion to a height above the first plane of each missing location marker; and displaying a transparent tail with a diameter proportion to a depth below the first plane of each missing location marker. The process, further comprising the steps of: storing an image of a map to a memory; and accessing an external database with an RF module to supply the memory with data.

Another embodiment relates to a portable unit comprising: a screen displaying a map at a first scale; a user marks at least two locations in the map by markers; the map is set to a second scale excluding at least one location markers; and a transparent arrow points to the excluded location marker.

In the world of entertainment, some users enjoy games such as angry birds, where the user interacts with the game. The physical interaction of the Sliding Window with the stationary image can be used to create a game where one may have to scan the area to reach certain goal locations that provide winning points. Obstacles may be placed in the paths which need to be avoided. The user can feel where the obstacles and the goal locations are by relative displacement from the initial or reference location. The user avoids touching the obstacle and making their way to the goal locations.

Another embodiment of a game would be to view several parallel planes and integrate the images together within the mind of the user. The user then uses this information to guess what the shape of the object is.

BRIEF DESCRIPTION OF THE DRAWINGS

Please note that the drawings shown in this specification may not necessarily be drawn to scale and the relative dimensions of various elements in the diagrams are depicted schematically. The inventions presented here may be embodied in many different forms and should not be construed as limited to the embodiments set forth herein. Rather, these embodiments are provided so that this disclosure will be through and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 1b shows a block diagram representation of the connection in FIG. 1a.

FIG. 3b presents a map of the first sub-portion that fills the full screen of a portable device at the magnified scale in accordance with the present invention.

FIG. 3d shows the map where the same large scale and a third sub-portion of the map can be viewed on the screen of a portable device depending on the scale in accordance with the present invention.

FIG. 10a illustrates the conventional map movement performed in a stationary portable device.

FIG. 10b shows the inventive portable device movement to view a stationary map that provides a Sliding Window perspective of a map in accordance with the present invention.

FIG. 16a illustrates transceivers in a local environment in accordance with the present invention.

FIG. 16b illustrates a handheld unit with transceivers in a local environment in accordance with the present invention.

FIG. 16c illustrates a handheld unit with transceivers and a processor in a local environment in accordance with the present invention.

DETAILED DESCRIPTION OF THE INVENTION

Figure 1A:
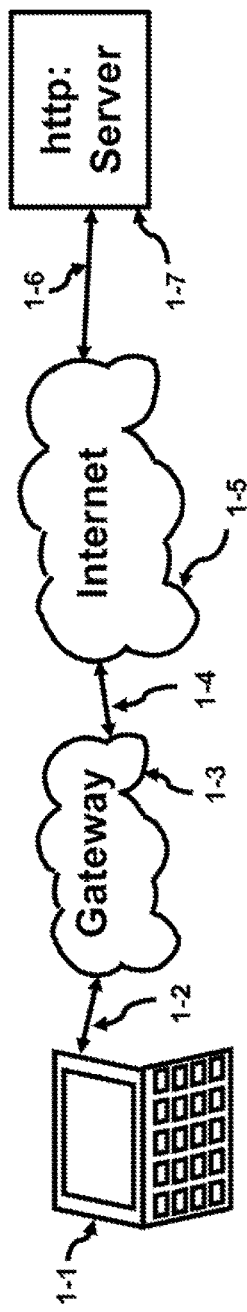
FIG. 1a depicts a connection between the internet and a notebook computer.

FIG. 1a illustrates a notebook computer with its pathways going to through the Internet to a server. The notebook computer 1-1 can wirelessly interconnect to a gateway 1-2 which along the path 1-4 connects up to the Internet 1-5. The Internet 1-5 has a connection 1-6 to a server 1-7. This path is bidirectional and allows the user of the notebook 1-1 to access the server's database for data, or to manipulate the server.

Figure 1B:
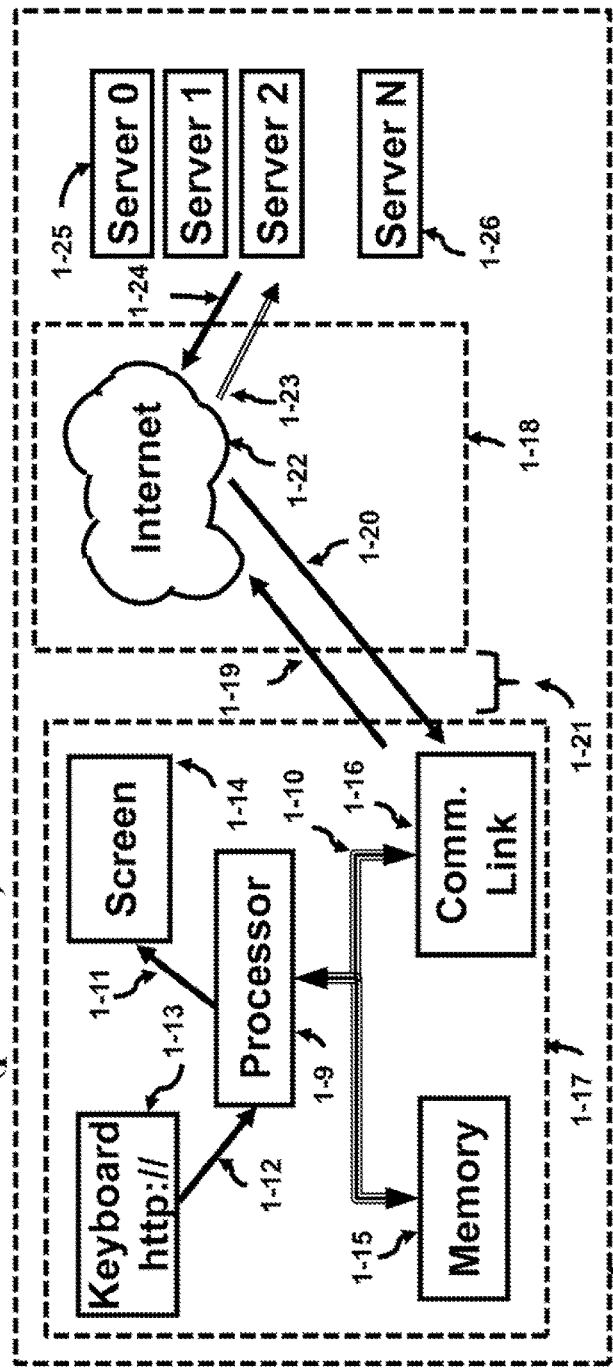

FIG. 1b presents a more descriptive illustration of the individual components that are in FIG. 1a. The entire system is in 1-8 which contains the notebook computer 1-17, the interface 1-21 between the computer and the Internet 1-18, the Internet itself, the interface between the Internet 1-18 and the servers, and a set of servers 0-N. The notebook 1-17 contains a keyboard 1-13 coupled to the processor by a network 1-12, a screen 1-14 coupled to the processor by interface 1-11. A communication bus 1-10 coupling the processor 1-9 to the memory 1-15 and a communication link 1-16. The communication link 1-16 couples through the bi-directional interface 1-19 and 1-20 to the Internet 1-18. The Internet can then couple to the servers 1-25 through 1-26 via the interconnect 1-24 and 1-23.

Figure 2A:
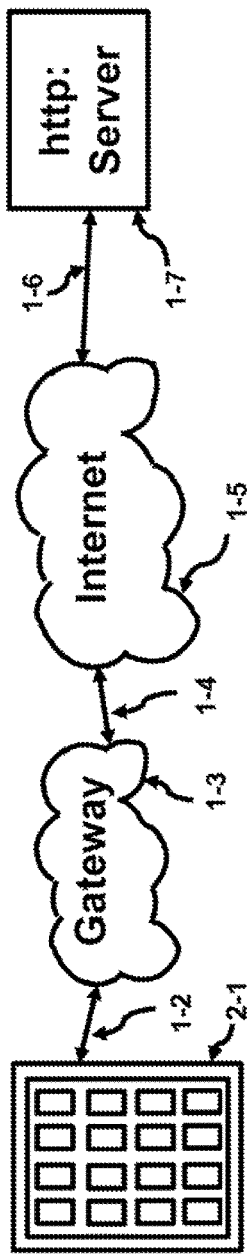
FIG. 2a illustrates a connection between the internet and a portable device in accordance with the present invention.

FIG. 2a presents a portable hand-held device or a smart phone 2-1 coupled to the Gateway by 1-2. The Gateway 1-3 is coupled to the Internet 1-5 by the interface 1-4 and the Internet 1-5 is coupled to the servers 1-7 by the interface 1-6. The interconnects 1-2, 1-4 and 1-6 are bi-directional allowing the portable unit or smart phone 2-1 to access the servers 1-7 for data or for the server to present data to the smart phone 2-1. The smart phone has a display screen that currently is presenting icons of various applications (the array of rectangles).

Figure 2B:
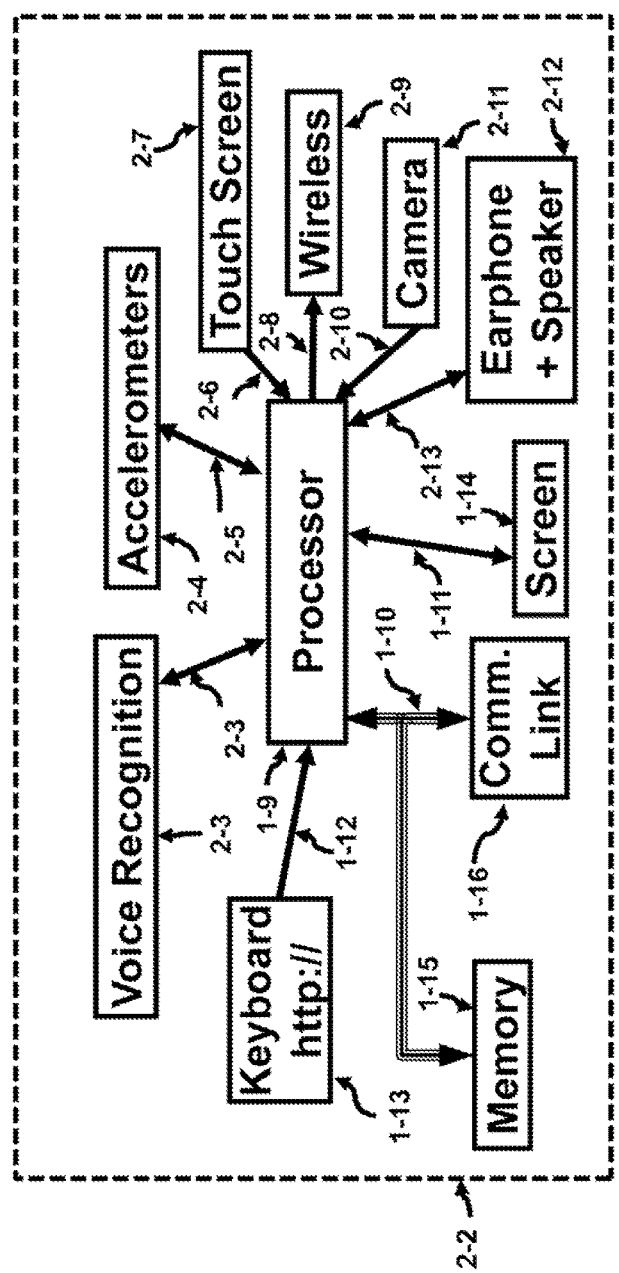
FIG. 2b shows a block diagram of the portable device in FIG. 2a in accordance with the present invention.

FIG. 2b presents a block diagram of the smart phone 2-2. The smart phone contains a processor 1-9 coupled by a bus 1-10 to a memory 1-15 and a communication link 1-16. The processor also interfaces to a keyboard 1-13 through the interface 1-12 and to a screen 1-14 by the interface 1-11. In fact, the screen can present a keyboard to the user. In addition, the processor can have other features which allow the user easier access to the device, as well as, providing additional input to the smart phone. For example, the smart phone can contain a voice recognition unit 2-3 that communicates to the processor by interface 2-3. An accelerometer or a set of accelerometers 2-4 providing directions in three dimensions can also be located within the smart phone 2-4 and coupled to the processor by interface 2-5. The touch screen 2-7 may be a sub-set of the screen 1-14 and can be sensitive to a finger touch sending the response via interface 2-6. For audio input and output response, an earphone and a speaker 2-12 can couple audio to/from the processor by 2-13 and for visual input, a camera 2-11 can provide input to the processor via interface 2-10. Lastly, the processor can couple externally through a wireless means 2-9 by the interface 2-8. Additionally there can be other features within the smart phone that may not be listed here, as for example; power supplies, batteries and other such units which are very typical of smart phones but not illustrated to simplify the complexity of the diagram.

Figure 3A:
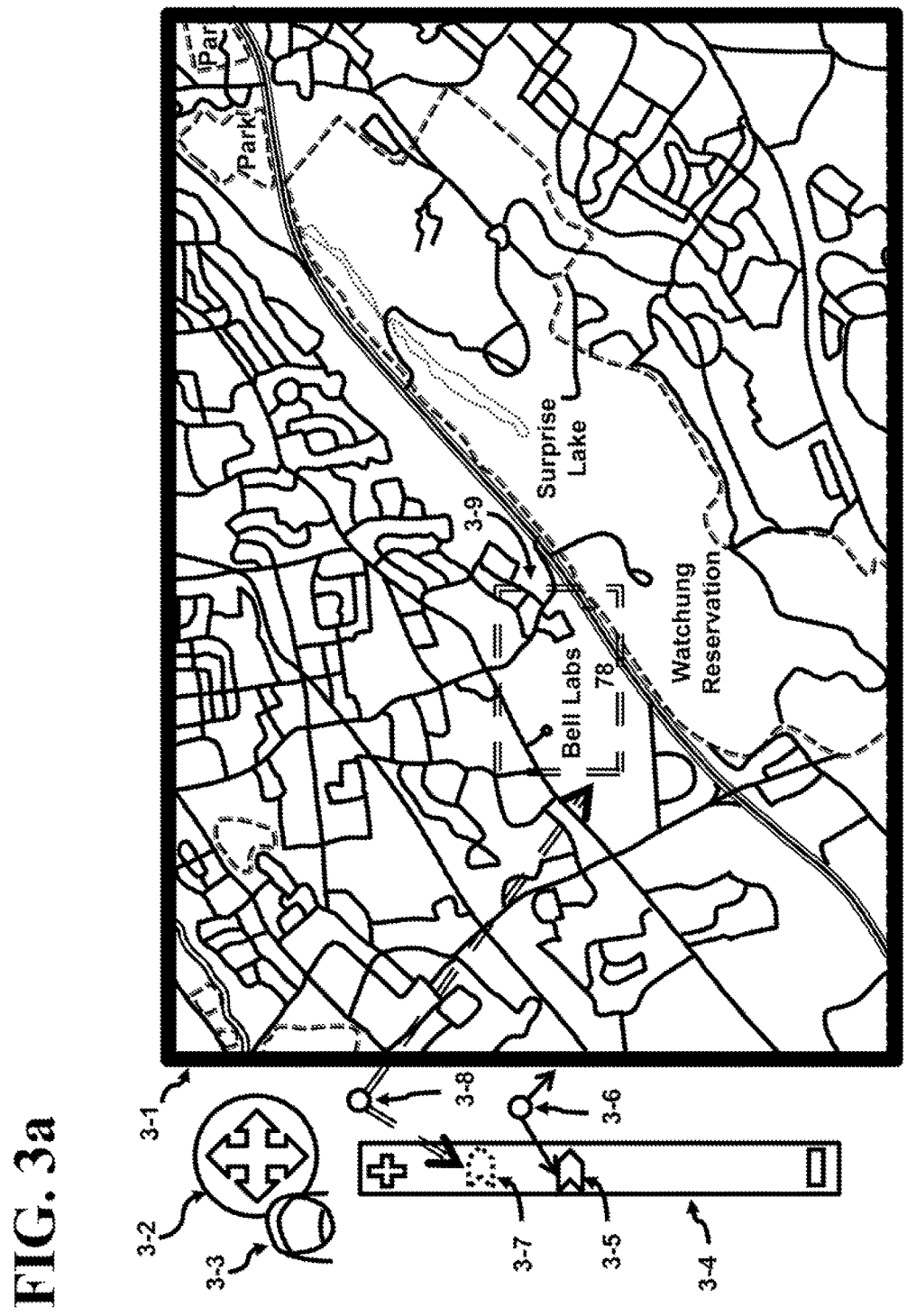
FIG. 3a presents a map where a large scale and a first sub-portion of the map can be viewed on the screen of a portable device depending on the scale in accordance with the present invention.

In FIG. 3a, the screen of a portable device is illustrated along with several features which can be displayed, for example, on a smart phone. Along the left boundary is a motion control 3-2 that can be depressed by a finger or thumb 3-3. By depressing the motion control an image or section of the map is presented on the display. When a search is performed, a magnification can be reduced to encompass more of the local area. This allows the user to view adjacent items or locations that may be of interest to the user. For example, the location searched was Bell Labs but the user notices that the Watchung Reservation and Surprise Lake are nearby. Since the user enjoys hiking, the user remembers the relative positions of these locations.

In FIG. 3a, the motion control can be depressed to move a particular sub-image of the map of the screen 3-1 into the center. Below the motion control is a scale 3-4 with a solid pointer 3-5. The scale provides the magnification state of the display or screen. The magnification increases as the pointer moves towards to the positive symbol while the magnification decreases as the pointer moves towards the negative symbol. Depressing the plus symbol moves the pointer upwards while depressing the negative symbol moves the pointer downwards. As the pointer moves towards the plus symbol; the image in the screen 3-1 is magnified. When the pointer moves toward the negative symbol at the other end of the scale; the image in the screen 3-1 is reduced or scaled down. Thus, by using the combination of the motion control 3-2 and the scale 3-4 together, a new sub-section of the map 3-9 can be displayed in the center and scaled (for example, see FIG. 3b).

Once the user selects a more magnified view of Bell Labs as illustrated in FIG. 3b, the user has a sense of where the Watchung Reservation and Surprise Lake are located. The user can then use the motion control 3-2 or slide their finger on the screen in the direction of either the Watchung Reservation or Surprise Lake at a magnification associated with the bubble 3-8 (slider at position 3-7). However, it is easy to get lost as one finger scrolls the map image by touching the screen or using the motion control 3-2. When the user gets lost happens, the user reduces magnification to find out their current location (returns back to FIG. 3*a*). When the pointer is at 3-5, the scale is set (as indicated by the bubble 3-6 illustrating the association of the two solid lined arrows) to provide the screen of the portable unit illustrated within the solid boundaries 3-1. As the solid pointer 3-5 is moved to and overlays the dotted pointer 3-7, the image within the dashed line boundary 3-9 is magnified to fill the full screen of 3-1; however, this magnification is not presented in FIG. 3*a* to simplify the diagram. In addition, when the motion control 3-2 is simultaneously depressed by the finger 3-3, a new image is presented within the dashed screen of 3-9 showing in this case the magnified location of Bell Labs, FIG. 3*b*. This new display would fill the original display screen 3-1 as depicted in FIG. 3*b*. The actual scale of 3-9 being equal to the scale of 3-1 has not been illustrated in FIG. 3*a* to simplify the diagram.

FIG. 3*b* depicts that the size of the display in 3-9 is identical to the size of the display in 3-1. For example, if the pointer is moved from 3-5 to 3-7 (as indicated by the bubble 3-8 illustrating the association of the two dashed lined arrows), the new display would present those components within the dashed region of 39. From this magnified image of the map, a more detailed description of the area surrounding Bell labs is presented. Some of the roads have been identified and named in addition, the motion control 3-2 and the scale 3-4 which currently are presented outside the boundaries of the screen of the portable unit would be transparently superimposed over the image of the map and would be located within screen of the portable unit but have not been presented in this regard in order to further simplify the diagram.

FIG. 3*b* illustrates the case where the bubble 3-8 links the pointer 3-7 and to the screen of the portable unit 3-9. Note that the screen of the portable unit 3-9 has the same dimensions as the screen of the portable unit 3-1 in FIG. 3*a*. The slider 3-7 occupies the same location on the scale 3-4 as in FIG. 3*a*. However, the map in FIG. 3*b* provides a greater detail than the dashed box 3-9 in FIG. 3*a*. The dashed box 3-9 in FIG. 3*a* is not shown to scale to simplify the presentation and description of FIG. 3*a*.

Figure 3C:
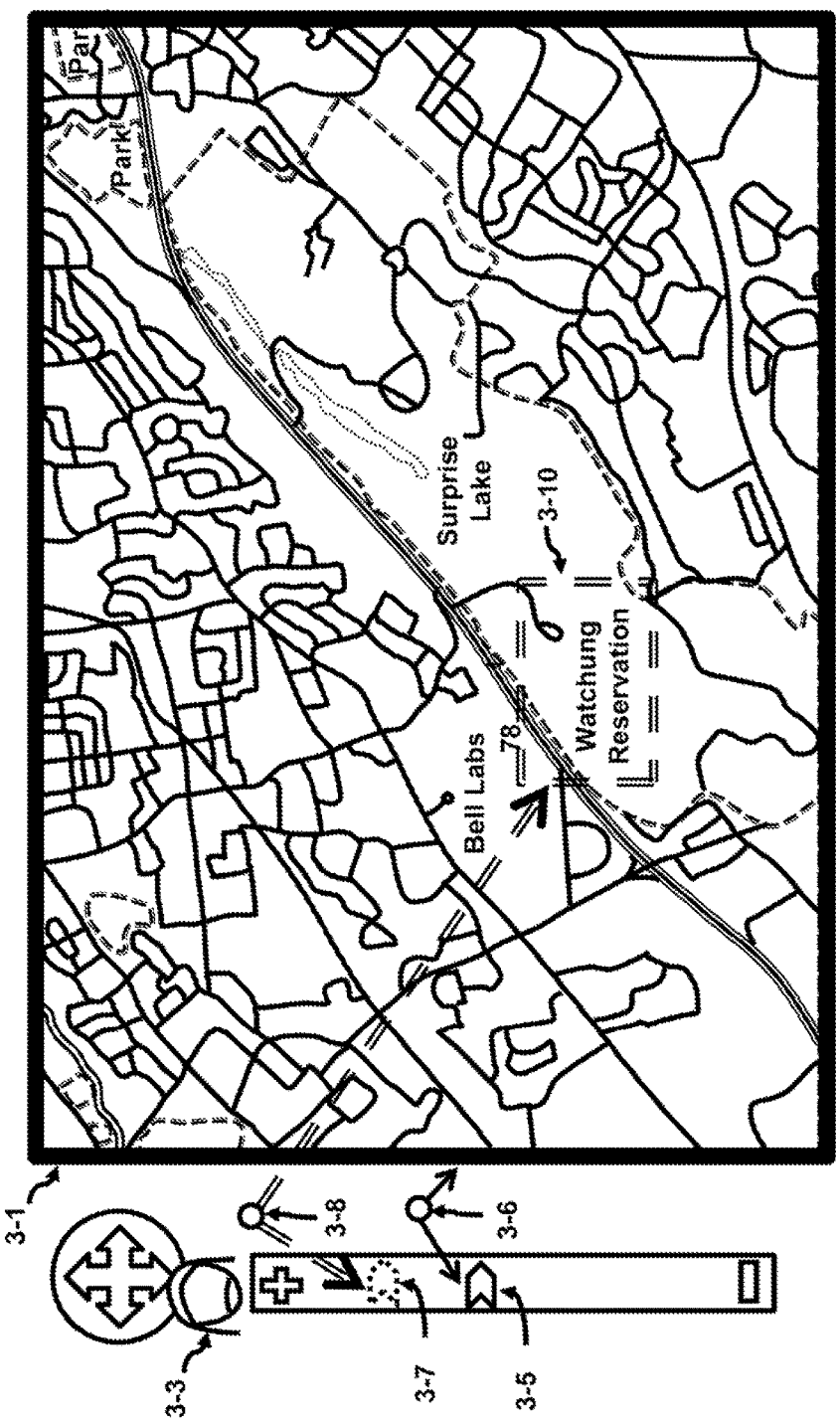
FIG. 3c depicts the map where the same large scale and a second sub-portion of the map can be viewed on the screen of a portable device depending on the scale in accordance with the present invention.

In FIG. 3*c*, the finger 3-3 is in a new position on the motion control 3-2 (therefore, a different portion of the map will be presented) and when the pointer on the scale moves from 3-5 to 3-7, the sub-region 3-10 of the map 3-1 shows the Watchung Reservation being presented in the dashed screen 3-10. As before, this new sub-region 3-10 of the map would fill the original display screen 3-1 although this is has not been illustrated to reduced complexity of FIG. 3*c*. Similarly in FIG. 3*d*, because the finger 3-3 is in yet a newer position on the motion control 3-2 (another portion of the map is presented) and when the pointer on the scale moves from 3-5 to 3-7, the newer sub-region 3-11 of the map 3-1 shows Surprise Lake being presented in the dashed screen 3-11. As before, this newer sub-region of the map would fill the original display screen 3-1 although this is has not been illustrated to reduced complexity of FIG. 3*d*.

Figure 4A:
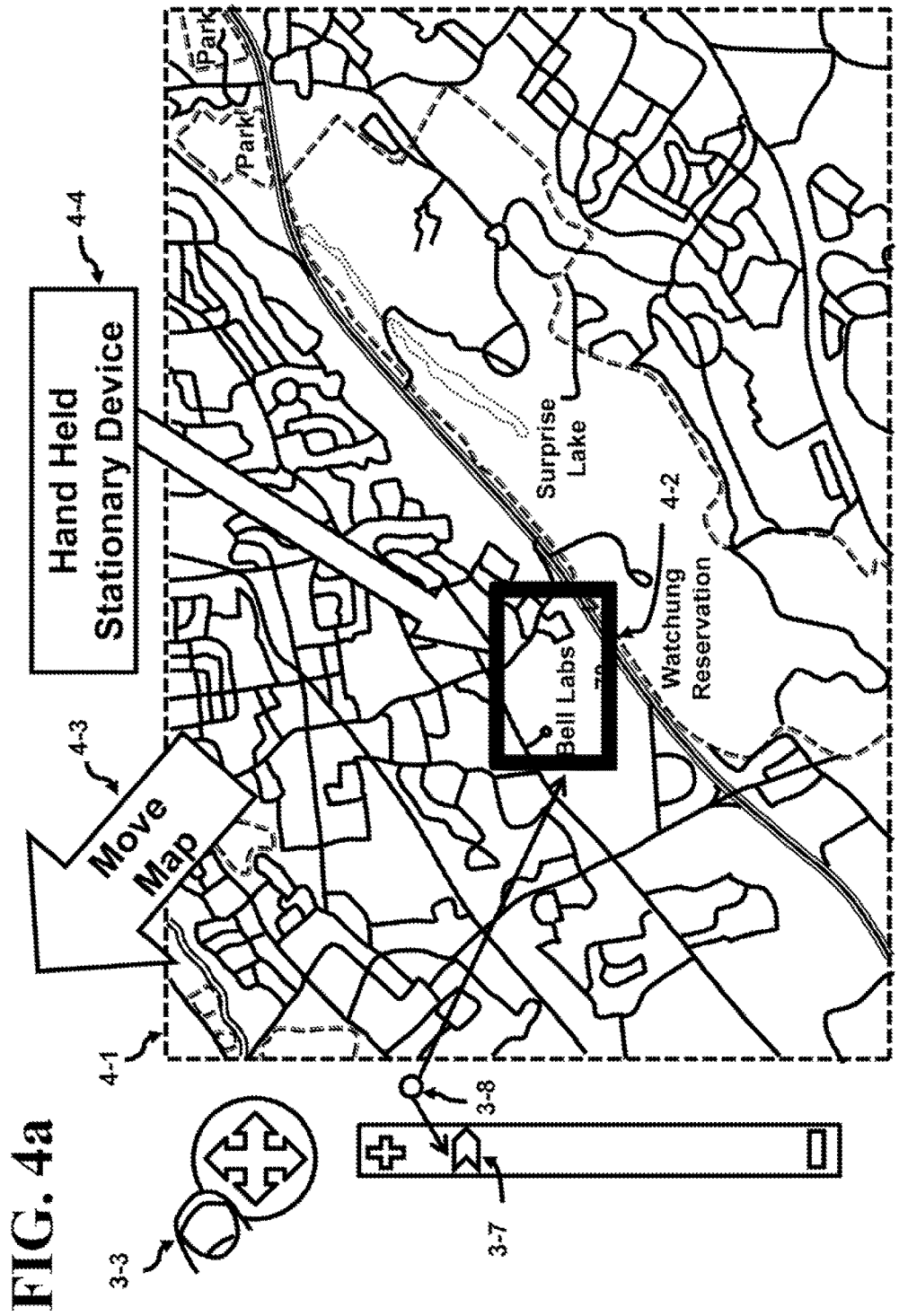
FIG. 4a illustrates the hand-held stationary device presenting the first sub-portion of the map on the screen of a portable device when the scale is magnified in accordance with the present invention.

In FIG. 4*a*, the pointer 3-7 is now a solid line the dashed line surrounding Bell Labs is also a solid line. The scale shows the pointer 3-7 related to the screen of the portable unit 4-2 by the bubble 3-8. The previous slides of FIG. 3*a-d* provided the knowledge of where the Watchung Reservation and Surprise Lake are located with reference to Bell Labs. To get from Bell Labs to the Watchung Reservation while always keeping the pointer 3-7 in a constant position (same as the scale in FIG. 3*b*), the following steps are followed. Again, what is actually presented on the screen of the portable unit 4-2 is equivalent to the map presented in FIG. 3*b*. The remaining portions of the map 4-1 in FIG. 4*a* are not in the current view. However, the user remembers that the Watchung Reservation was to the lower right. Thus, the finger 3-3 depresses the motion control 3-2 to cause the map 4-1 to move in a direction shows according to the move map arrow 4-3 to slide in this portion of the map 4-1. The display currently presents the location of Bell Labs on the screen of the portable unit 4-2. The screen of the portable unit 4-2 would appear similar to that of FIG. 3*b*. In this case, the handheld stationary device 4-4 indicates that the device remains stationary while the map moves. If the map is moved in the direction of the arrow 4-3, the screen displays the map as the map is moving in the direction of the arrow 4-3 until the screen eventually presents the Watchung Reservation.

Figure 4B:
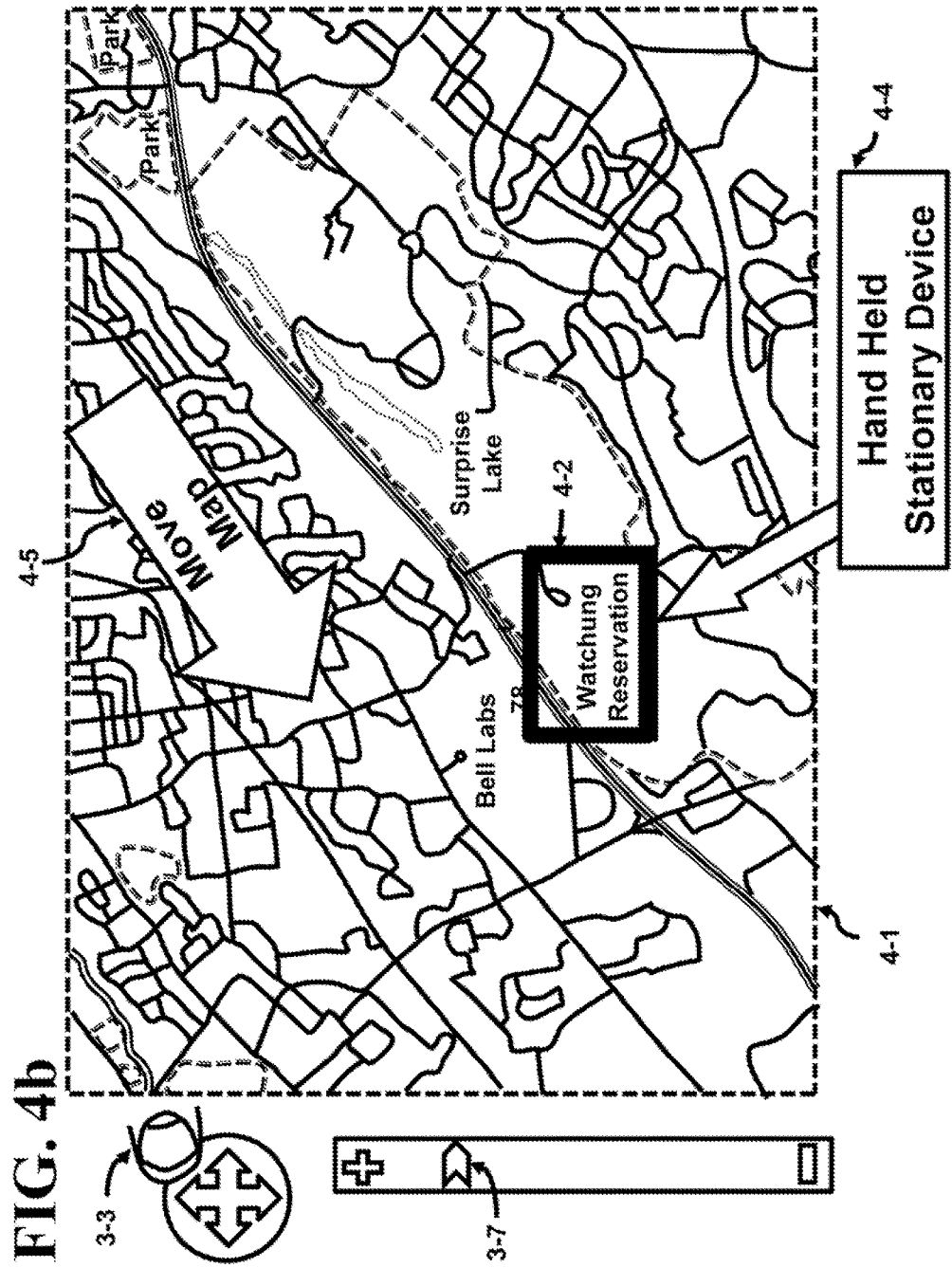
FIG. 4b depicts the hand-held stationary device presenting the second sub-portion of the map on the screen of a portable device when the scale is magnified in accordance with the present invention.
Figure 4C:
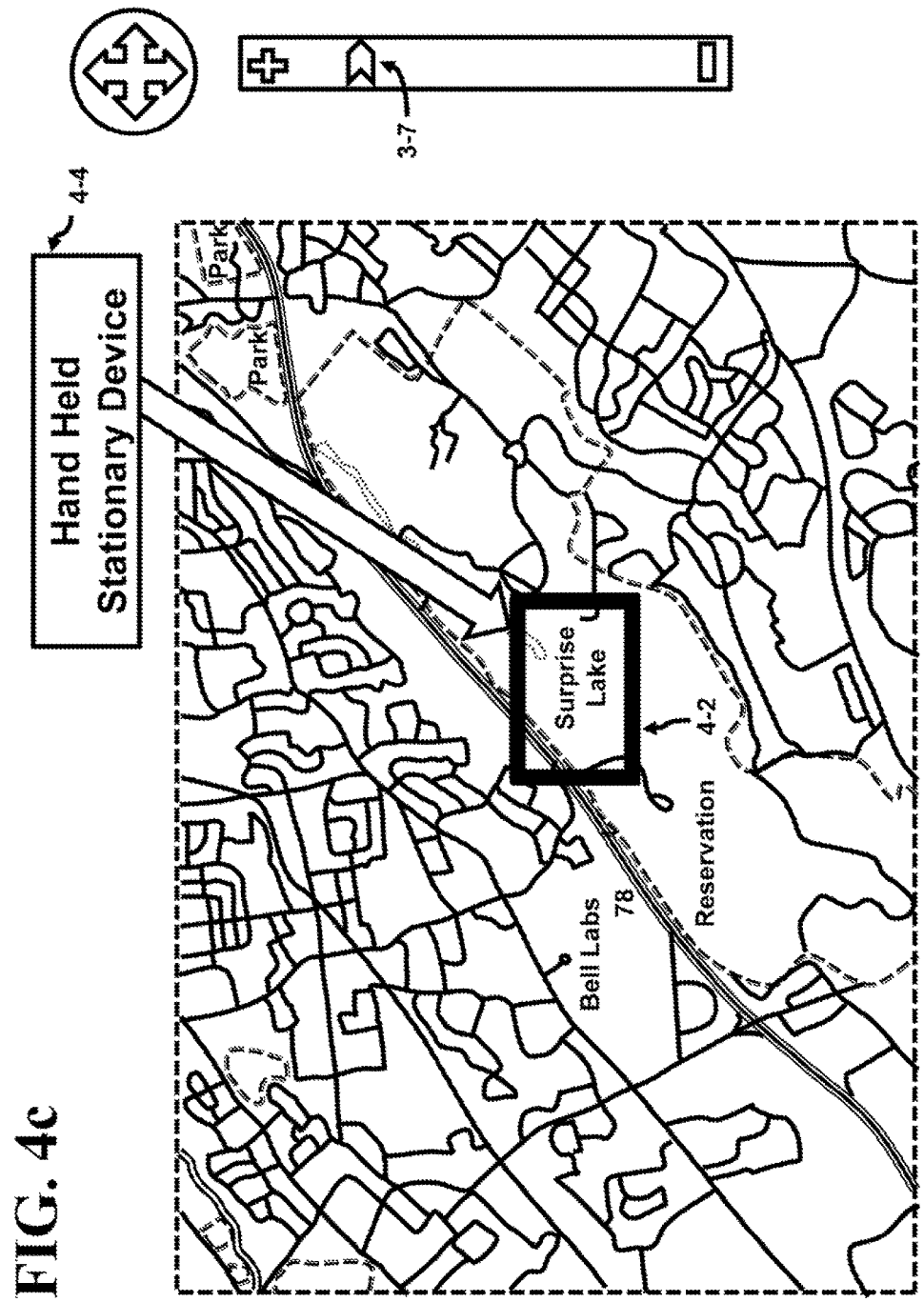
FIG. 4c illustrates the hand-held stationary device presenting the third sub-portion of the map on the screen of a portable device when the scale is magnified in accordance with the present invention.

In FIG. 4*b*, the screen of the portable unit 4-7 is now shown presenting the Watchung Reservation. Note that the pointer 3-7 remains at the same scale as before and has not been moved. Now the user desires to move to Surprise Lake and remembers that Surprise Lake is located to the upper right. So the finger 3-3 is placed in a corresponding location of the motion control 3-2 to move the map 4-1. This will cause the background map to move in the direction of the move map arrow 4-5. Another method of moving the map is also possible by placing the finger on the directly on the screen and moving the finger across the screen in the direction of the arrow 4-5; the map will then follow the finger. The handheld stationary device 4-4 (note that this portable unit does not move, while the map is moved) will eventually present a different portion of the map. In FIG. 4*c*, this new portion of the map shows Surprise Lake which is illustrated within the screen of the portable unit 4-8.

Figure 5A:
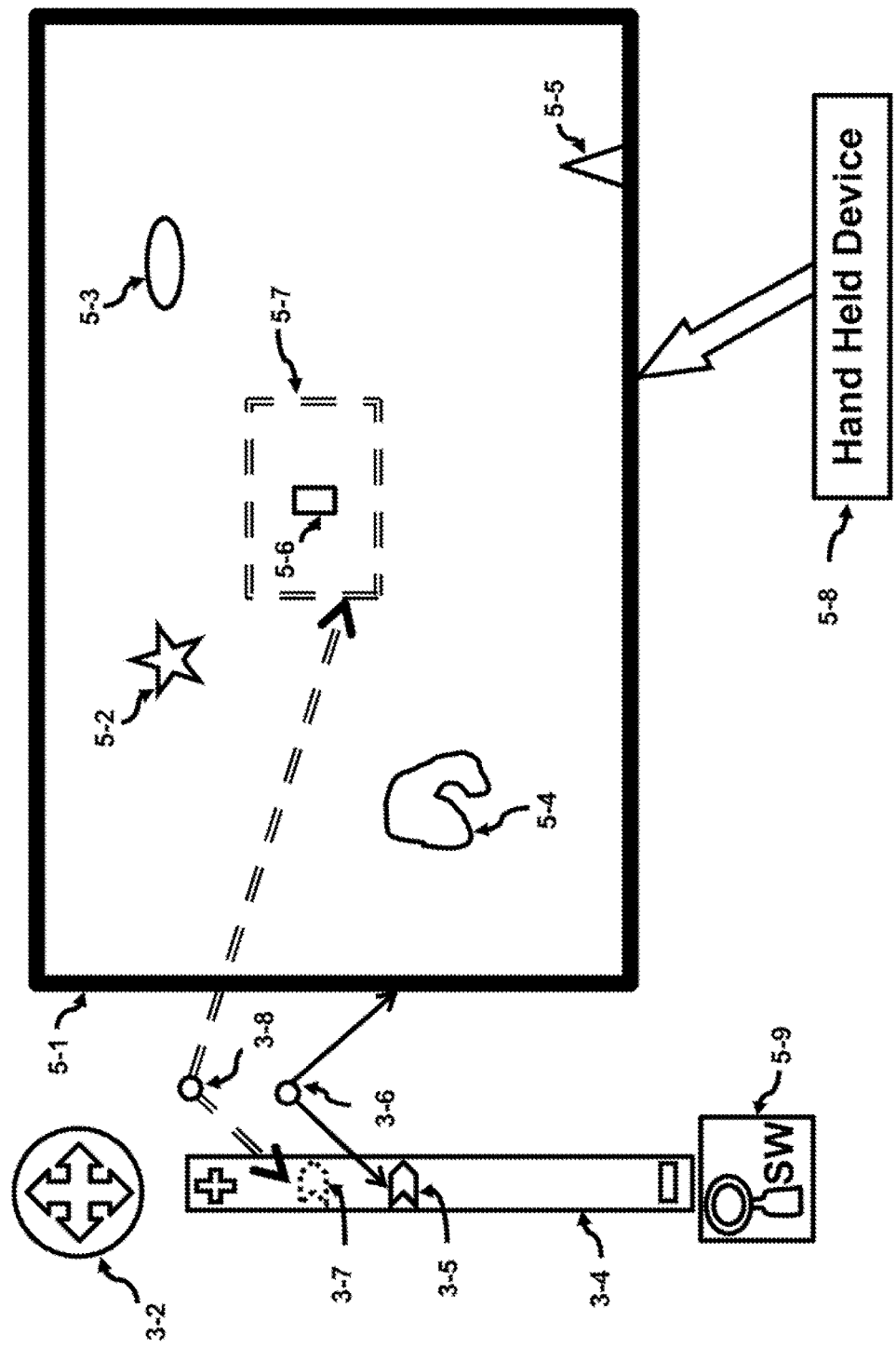
FIG. 5a depicts a representative map where a large scale and a first sub-scale portion of the representative map can be viewed on the screen of a portable hand held device depending on the scale in accordance with the present invention.
Figure 5B:
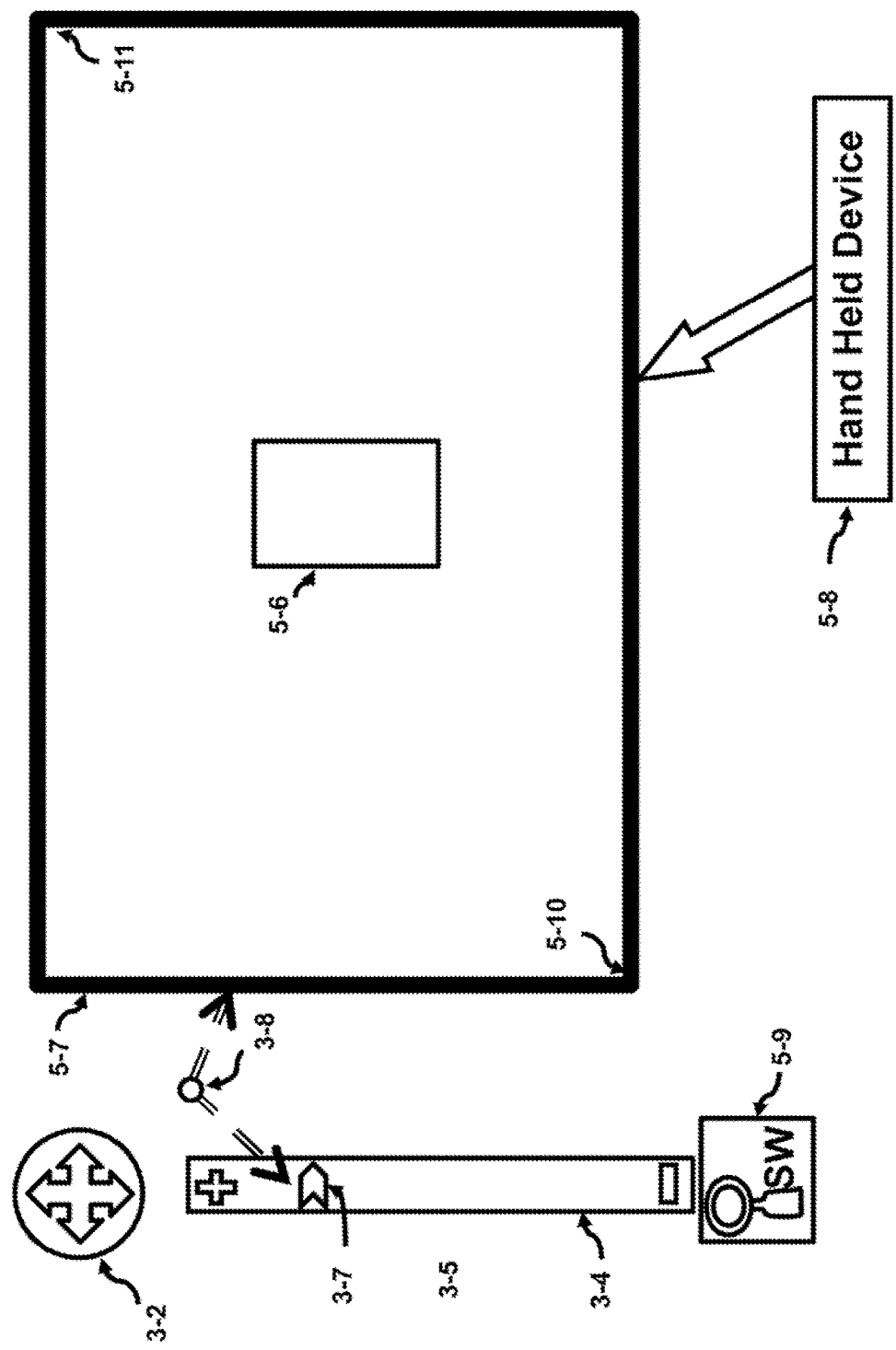
FIG. 5b depicts a representative map where the first sub-scale portion of the representative map is viewed on the screen of a portable hand held device at a magnified scale in accordance with the present invention.

In FIG. 5*a*, one embodiment of the invention is illustrated. In this case, instead of a detailed geographical map, a simplified map providing a few features of an idealized map is presented to simplify the discussion. The motion control 3-2 is at the top left while the scale 3-4 illustrates two pointers; a solid pointer 3-5 and a dotted pointer 3-7, in the same position as before therefore providing the same scale. Beneath the scale is a new icon or identifier called the Sliding Window identifier 5-9. The pointer at 3-5 corresponds to the main display screen 5-1. The remaining background images in the map have been removed to improve the description of the invention. For example, within the screen of the portable unit 5-1, there is only a star 5-2, an oval 5-3, a shaped structure 5-4, a triangle 5-5, and a rectangle 5-6. The bubble 3-8 relates the pointer 3-7 to the screen of the portable unit 5-7 with the same scale as before. The screen of the portable unit 5-7, although it's illustrated smaller here, will have the full-size of the display of the handheld device 5-1. The portable unit is a hand held device 5-8. FIG. 5*b* presents the screen of the portable unit 5-7 with the rectangle 5-6 scaled to the same size as the previous slide. Note that through the magnification process of scaling, the second screen of the portable unit 5-7 to have the same dimensions as the first screen of the portable unit 5-1, the rectangle 5-6 is also scaled appropriately. The diagonal of the screen is measured from corner 5-10 to corner 5-11.

The user can enter this Sliding Window mode several different ways. The user can tilt and a shift of the handheld unit in a certain order or sequence to initiate the handheld unit to enter the Sliding Window mode. Another possibility is to wiggle the unit a particular way, there can be a multitude of ways the unit can be moved to enter the mode. Another method is by voice command by stating "Sliding Window mode". Using verbal commands simplifies the process of entering into the mode. Finally, a button (on a touch screen or a physical one on the unit) can be touched/depressed to enter the Sliding Window mode. This method provides an easy procedure to enter the mode. Similarly, an equivalent procedure can be used to leave the mode.

Figure 6A:
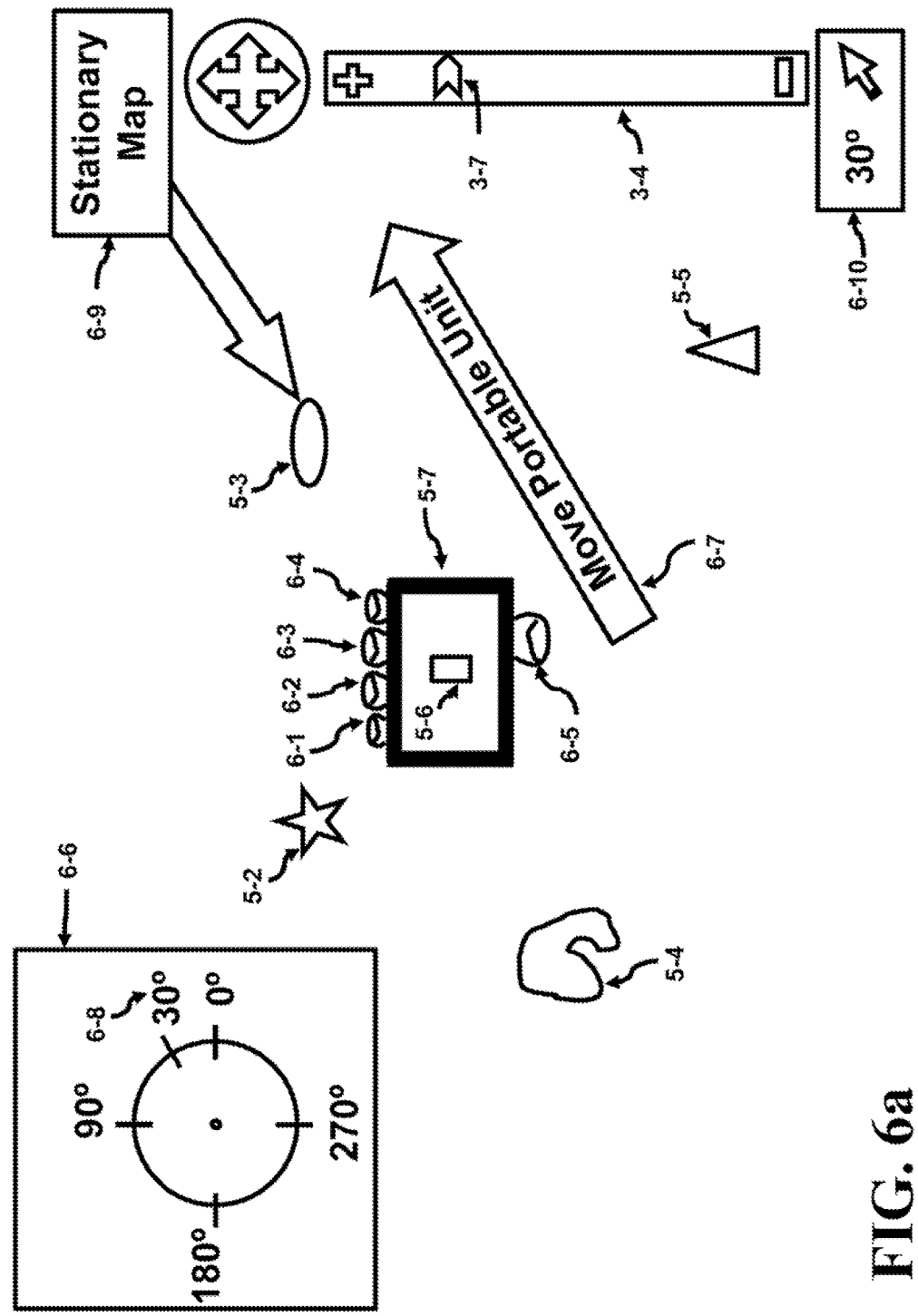
FIG. 6a shows a sub-scale portion of the representative map of FIG. 5a can be viewed on the screen of a portable hand held device when the scale is magnified in accordance with the present invention.

In FIG. 6a, the screen of the portable unit 5-7 is now being held by a user's hand grasped by the thumb 6-5 and the fingers 6-1 through 6-4. The screen of the portable unit 5-7 presents a portion of the image of a stationary map 6-9 showing the rectangle 5-6. In FIG. 4a-c, the map or image was moved while the portable unit remains stationary. The inventive embodiment in FIG. 6 uses a stationary map while the portable unit is moved. The background map in this case remains stationary as indicated by 6-9. The objects of the image of a swum/my map 6-9 include: the star 5-2, the oval 5-3, the shaped structure 5-4 and the triangle 5-5. These objects are in the map but currently they are not displayed within the display of 5-17 because the physical size of the screen and the current scale (or magnification) only displays the rectangle 5-6 and its local vicinity. The screen will be located in front of the user at a comfortable distance from the user's face and the origin is assigned to this location (0, 0). The origin can be mapped to a point in the image of the stationary map. The user of the portable device moves the physical device in the direction of the arrow 6-7 remembering earlier (see FIG. 5a) that the oval was located to the upper right. The movement corresponds to 30° 6-8 as indicated within the compass 6-6. The diagram within shows the 0°, 90°, 180° and 270° marks on a circle and one referring back to the arrow 6-7 and the new angle 30° 6-8 within the compass 6-6. The image of a stationary map as indicated by 6-9. Beneath the scale 3-4 is the Sliding Window identifier 6-10 that now contains a small arrow pointing in the direction of movement and the degree relationship 30° of the arrow. Both, the compass 6-6 and identifier 6-10 would be transparent and displayed on the screen.

The origin can be assigned to any point on the image of the stationary map. The mapping can be done by touch screen, entry of the address of the location, voice command or cursor control. The origin allows the user to select a reference point which allows the user to reach this reference point quickly or conversely use the reference point to base measurements with respect to this point.

The reference angle of 0° can be set by an initialization process by placing the X-axis, for example, on the two dimensional representation of the image of the stationary map. The unit can be moved back and forth in a plane perpendicular to the user along a horizontal line, for example, to indicate where the 0°-180° line exists. Since the user is facing the screen, the software within the unit can determine where the 0° reference angle is with respect to the user which would be located to the right of the user.

The distance that the portable device moves is determined by an inertial guidance system (described later) and this distance is related to the scale of the map. The scale of the map being viewed is known by the system. This scale could be, for example, a 10 cm displacement corresponding to 100 m used by the software to generate information that instructs the inertial guidance system to adjust distance measurement such that a 10 cm displacement corresponds to 100 m. As the user moves the portable unit, the screen of the portable unit presents a moving map to the user while the image of a stationary map is presented to the portable device. Since the screen and map have the same scale, the map on the screen substantially superimposes over the map of the image of a stationary map. In other words, the map on the screen mirrors or matches that portion of the stationary map. The user can now sense or feel the distance between location on the map by experiencing the distance and angle displacement.

Figure 6B:
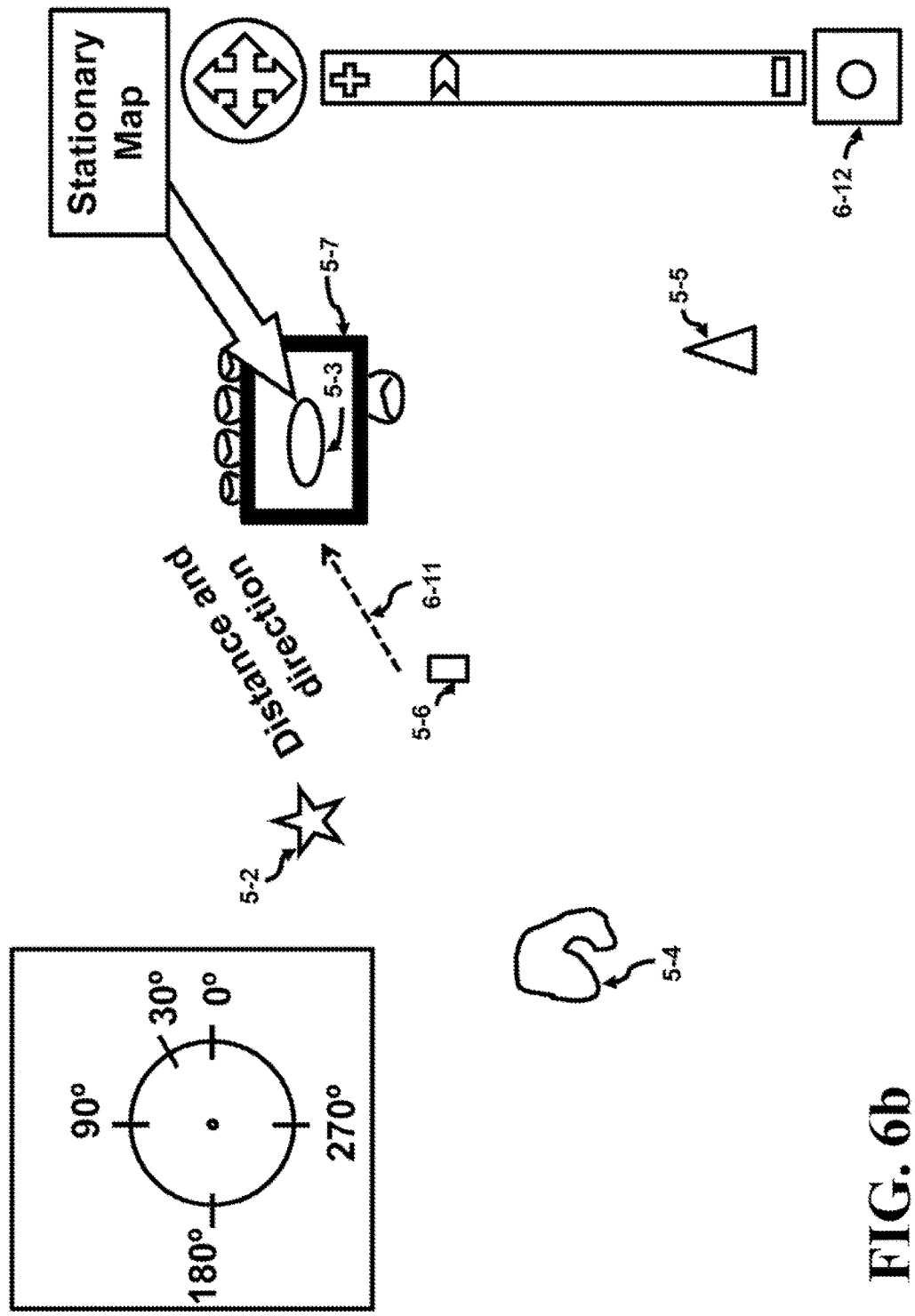
FIG. 6b illustrates a first sub-scale portion of the representative map of FIG. 5a that can be viewed on the screen of a portable hand held device after the portable hand held device is physically moved in accordance with the present invention.

In FIG. 6b, the portable device was moved until the display 5-7 presents the oval 5-3 within the display screen of the portable unit. The portable unit has been moved through a distance and direction corresponding to vector 6-11. A vector has a magnitude (distance) and direction (angle). Once the portable unit presents the oval 5-3, the unit is paused to view the image. Below the slider scale, the Sliding Window identifier 6-12 illustrates a circle indicating that the user has stopped movement of his portable device.

Figure 6C:
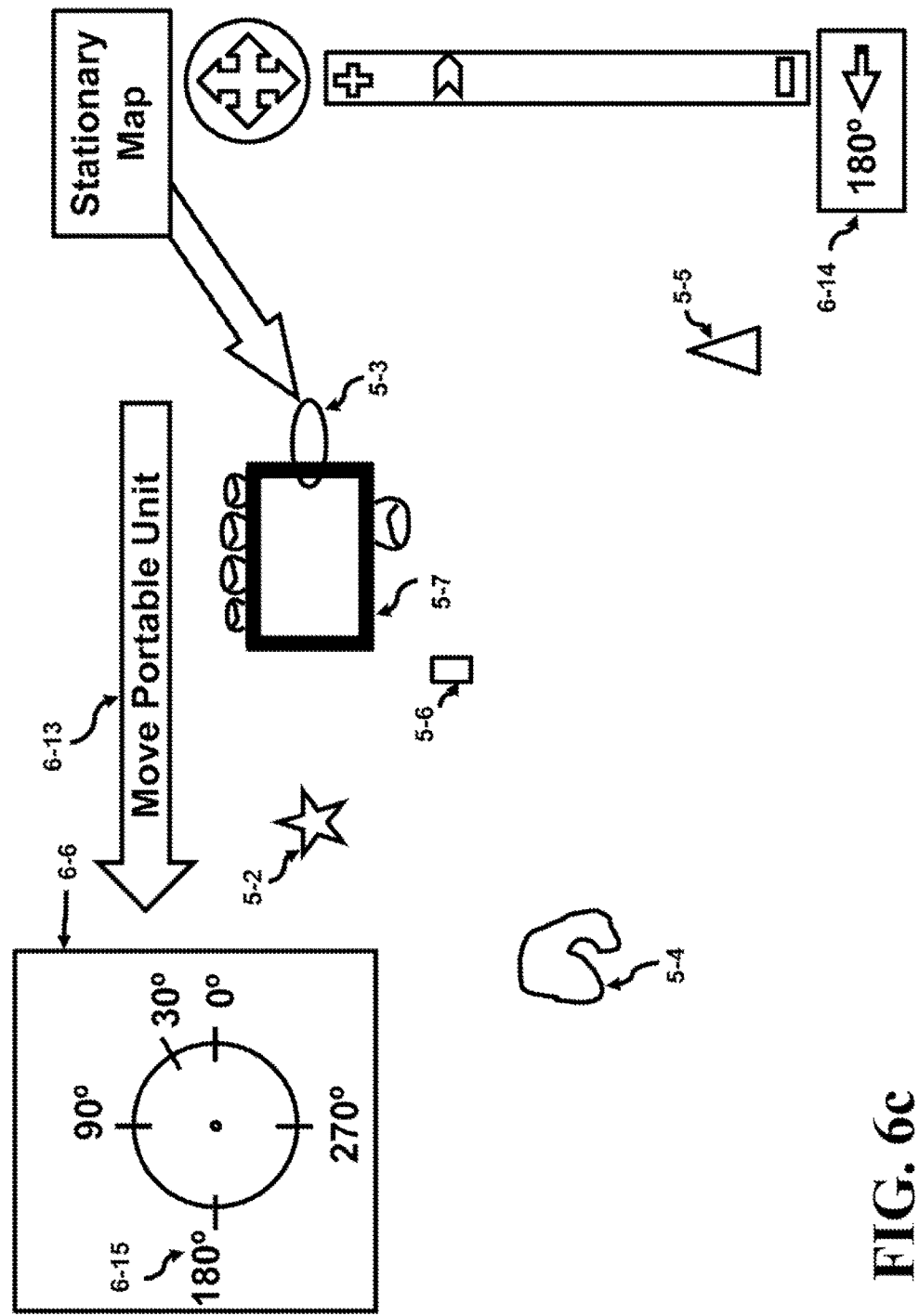
FIG. 6c shows a second sub-scale portion of the representative map of FIG. 5a that can be viewed on the screen of a portable hand held device after the portable hand held device is physically moved in accordance with the present invention.
Figure 6D:
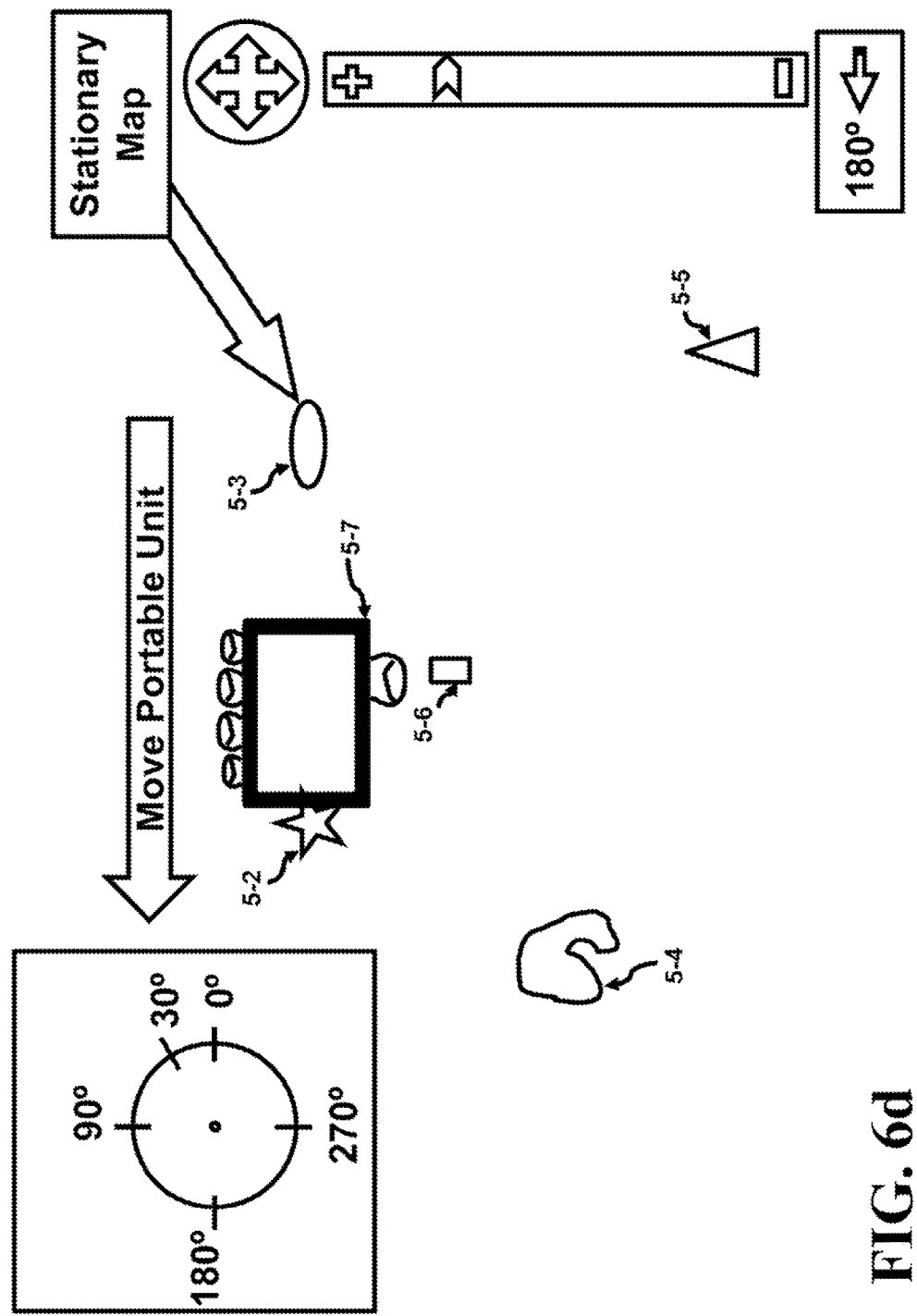
FIG. 6d depicts a third sub-scale portion of the representative map of FIG. 5a that can be viewed on the screen of a portable hand held device after the portable hand held device is physically moved in accordance with the present invention.

In FIG. 6c, the user now moves the screen of the portable unit 5-7 in a direction of 180° as indicated by the move portable unit arrow 6-13. The compass 6-6 indicates a direction, in this case, indicating a 180° 6-15 movement as indicated by the arrow 6-13. Once again, the map remains stationary while only the physical device held by the user is moved 6-13. Below the slider is the Sliding Window identifier 6-14 indicating a 180° movement as indicated by the arrow and the indicated value of degrees. In FIG. 6d, the user is still moving the portable device and the display screen 5-7 in the same direction as indicated by the arrow. This is verified by the Sliding Window identifier below the slider which indicates that the arrow is pointed at 180°.

Figure 6E:
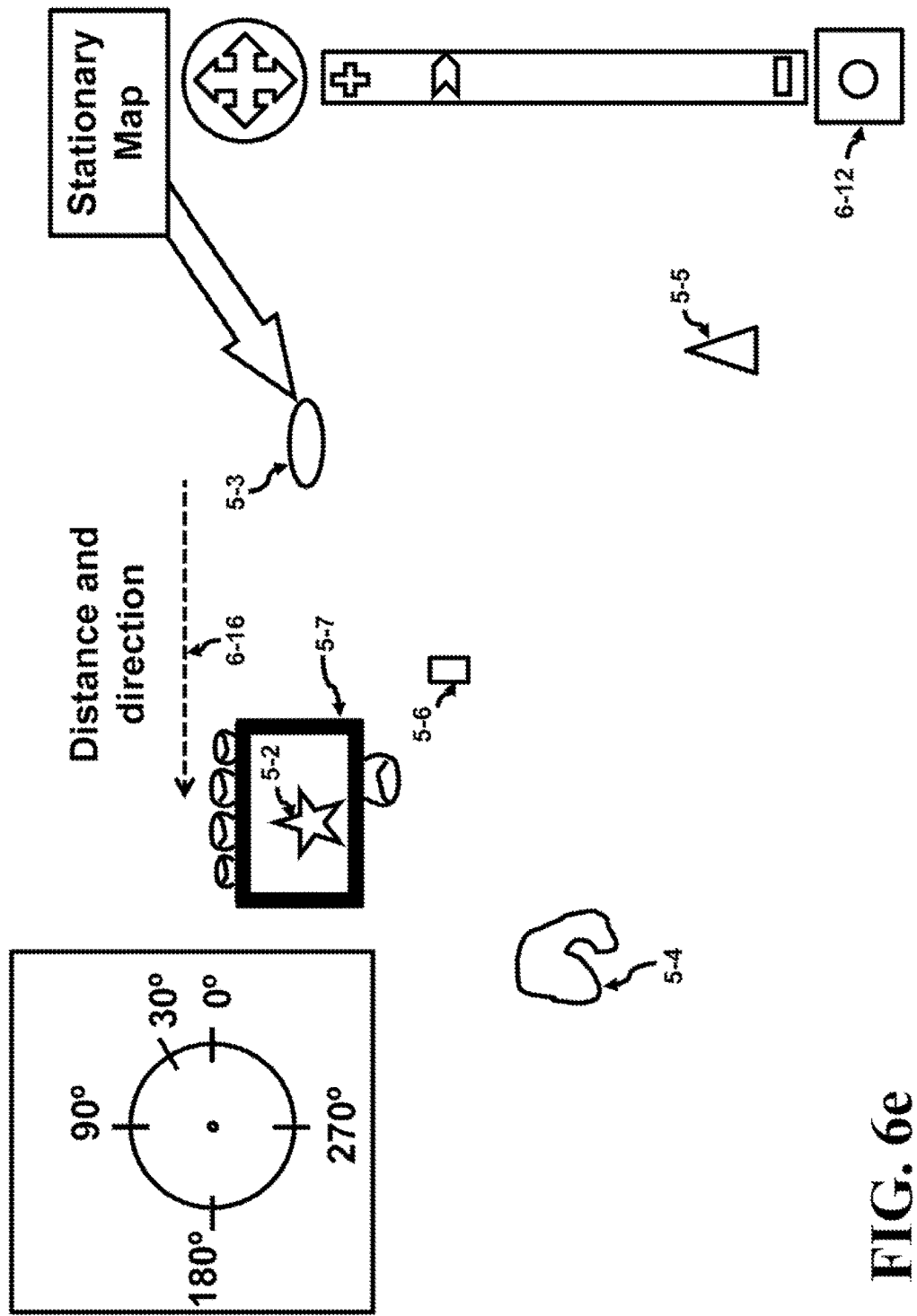
FIG. 6e illustrates a fourth sub-scale portion of the representative map of FIG. 5a that can be viewed on the screen of a portable hand held device after the portable hand held device is physically moved in accordance with the present invention.

In FIG. 6e, the screen of the portable unit 5-7 is now paused over the star 5-2 which is shown on the display screen. The distance and direction between the oval 5-3 and a star 5-2 is illustrated by the vector 6-16. The Sliding Window identifier 6-12 indicates that the user has stopped movement since the circle is within the box.

Figure 6F:
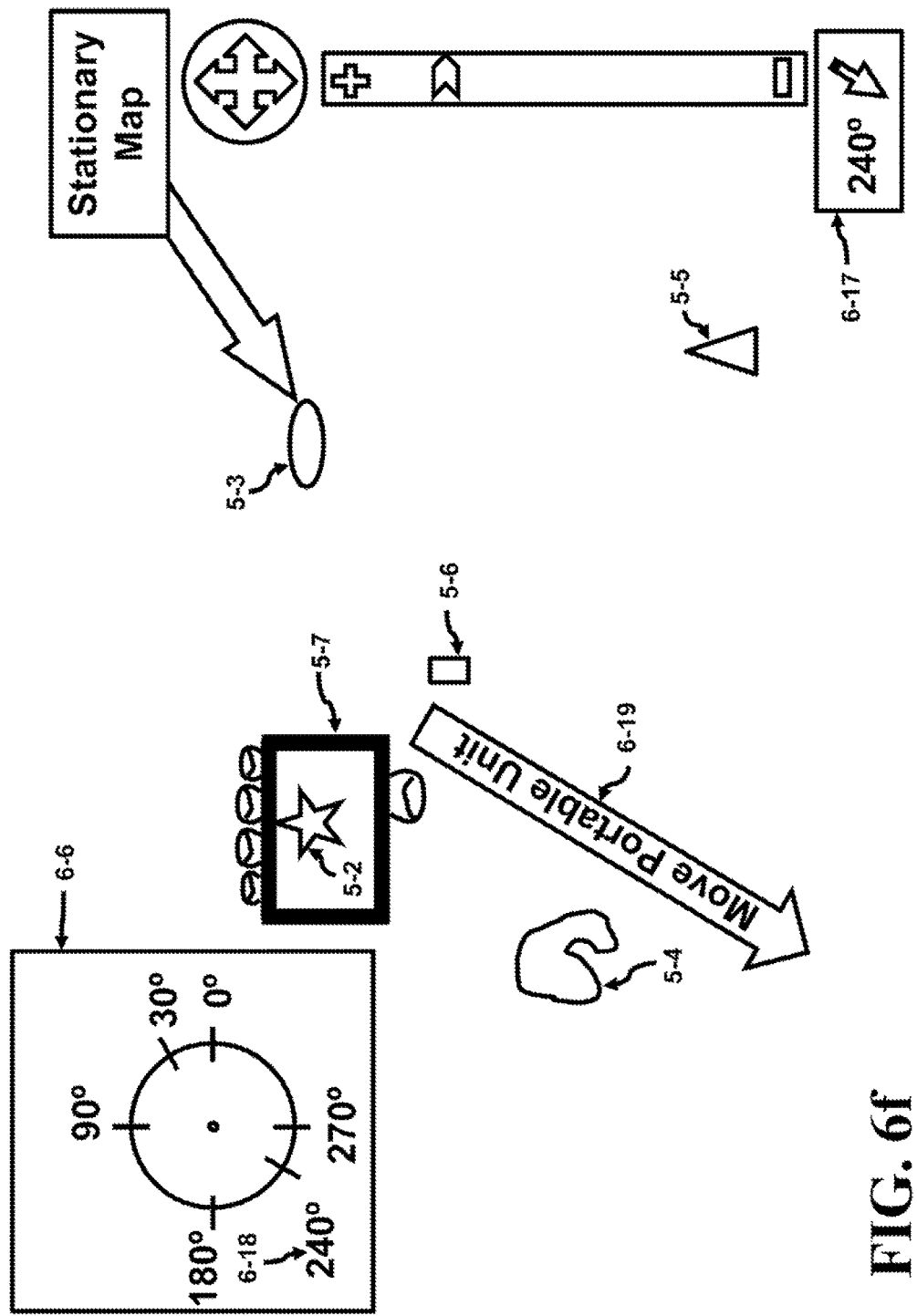
FIG. 6f illustrates a fifth sub-scale portion of the representative map of FIG. 5a that can be viewed on the screen of a portable hand held device after the portable hand held device is physically moved in accordance with the present invention.

In FIG. 6f, the user now moves in the direction of the arrow 6-19. As the user moves the portable unit, the user is observing the screen of the portable unit 5-7 and can see any minute details in the background f the stationary map as it progresses along the direction of the arrow 6-19. Below the slider the Sliding Window identifier 6-17 indicates the direction of movement of the portable unit by the arrow and the angular relationship of that arrow being 240°. Referring now to the compass 6-6, the new degree movement of 240° 6-18 is entered.

Figure 6G:
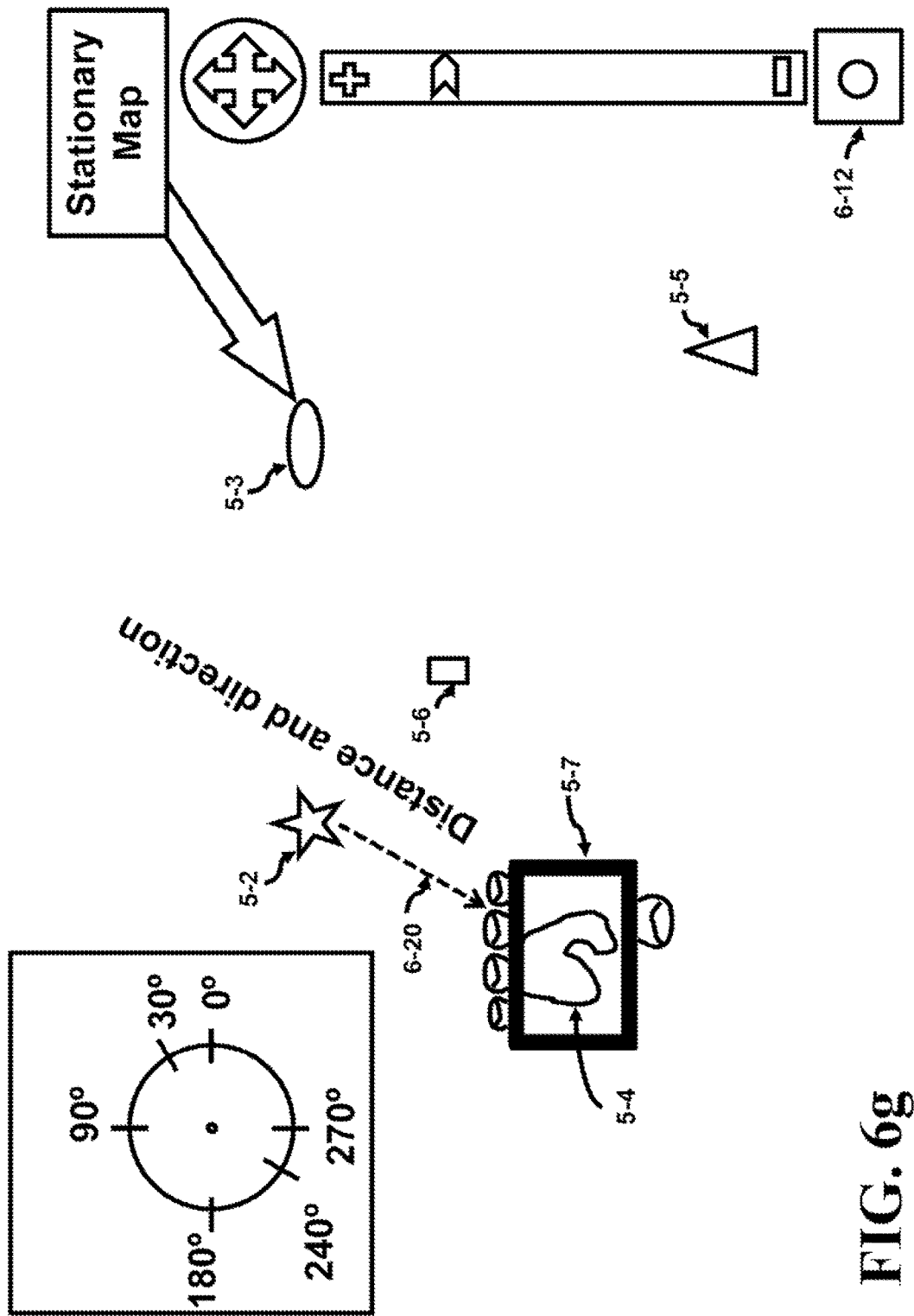
FIG. 6g depicts a sixth sub-scale portion of the representative map of FIG. 5a that can be viewed on the screen of a portable hand held device after the portable hand held device is physically moved in accordance with the present invention.

In FIG. 6g, the screen of the portable unit 5-7 now presents the object 5-4. In addition the distance and direction between the star 5-2 and the object 5-4 is presented by the vector 6-20. Below the slider since the portable device is stationary, the box indicates that the device is not moving by the zero within the identifier 6-12.

Figure 6H:
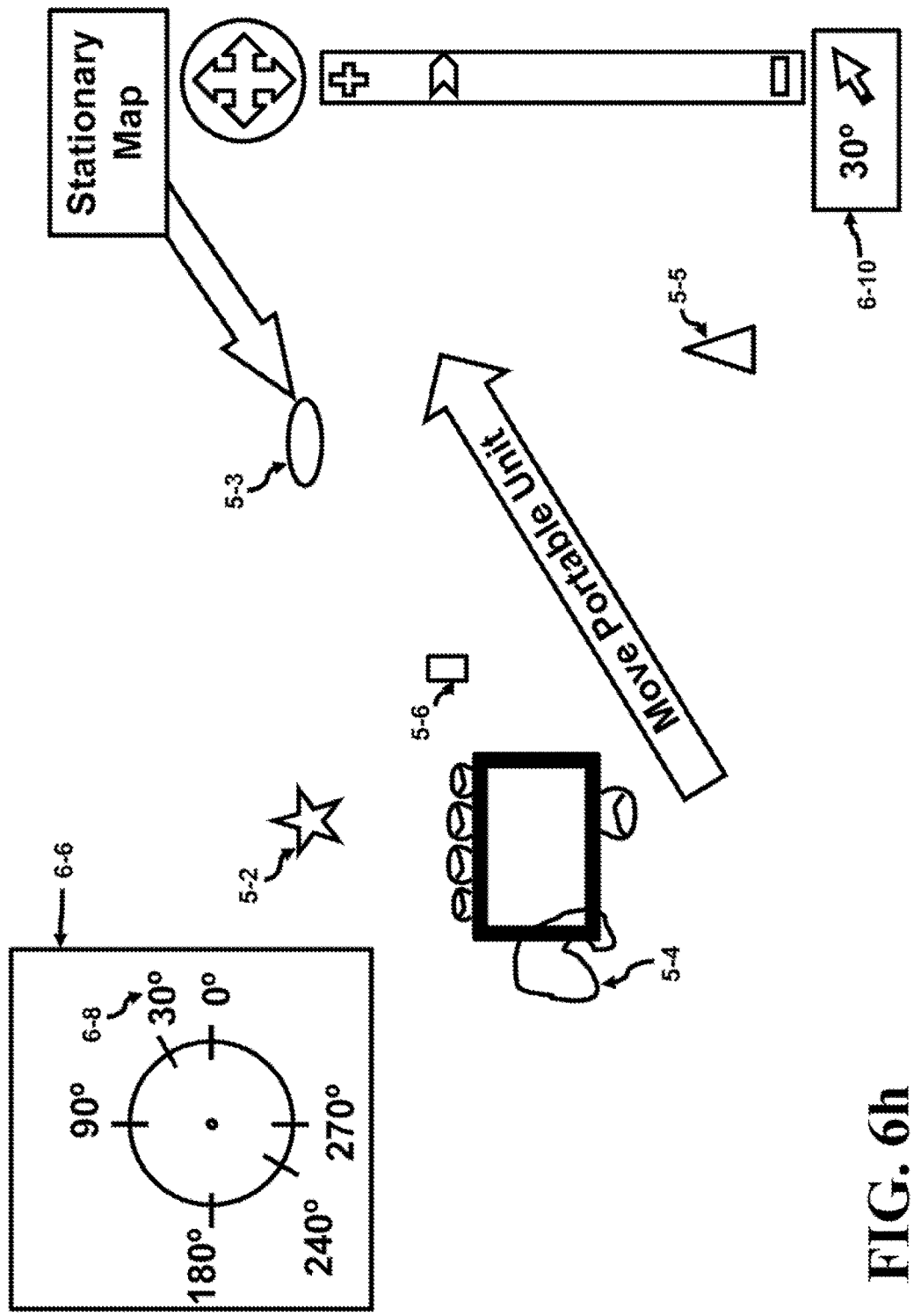
FIG. 6h shows a seventh sub-scale portion of the representative map of FIG. 5a that can be viewed on the screen of a portable hand held device after the portable hand held device is physically moved in accordance with the present invention.

In FIG. 6h, the user moves the screen of the portable unit 5-7 in the direction of the move portable unit arrow. Once again, the map remains stationary while only the physical device moves. While the portable unit moves the display screen presents any of the details associated with the map. Since the potable unit is moving, the Sliding Window identifier 6-10 below the slider presents the direction of movement of the unit by the arrow at 30°. The compass box 6-6 illustrates the 30° 6-8.

Figure 6I:
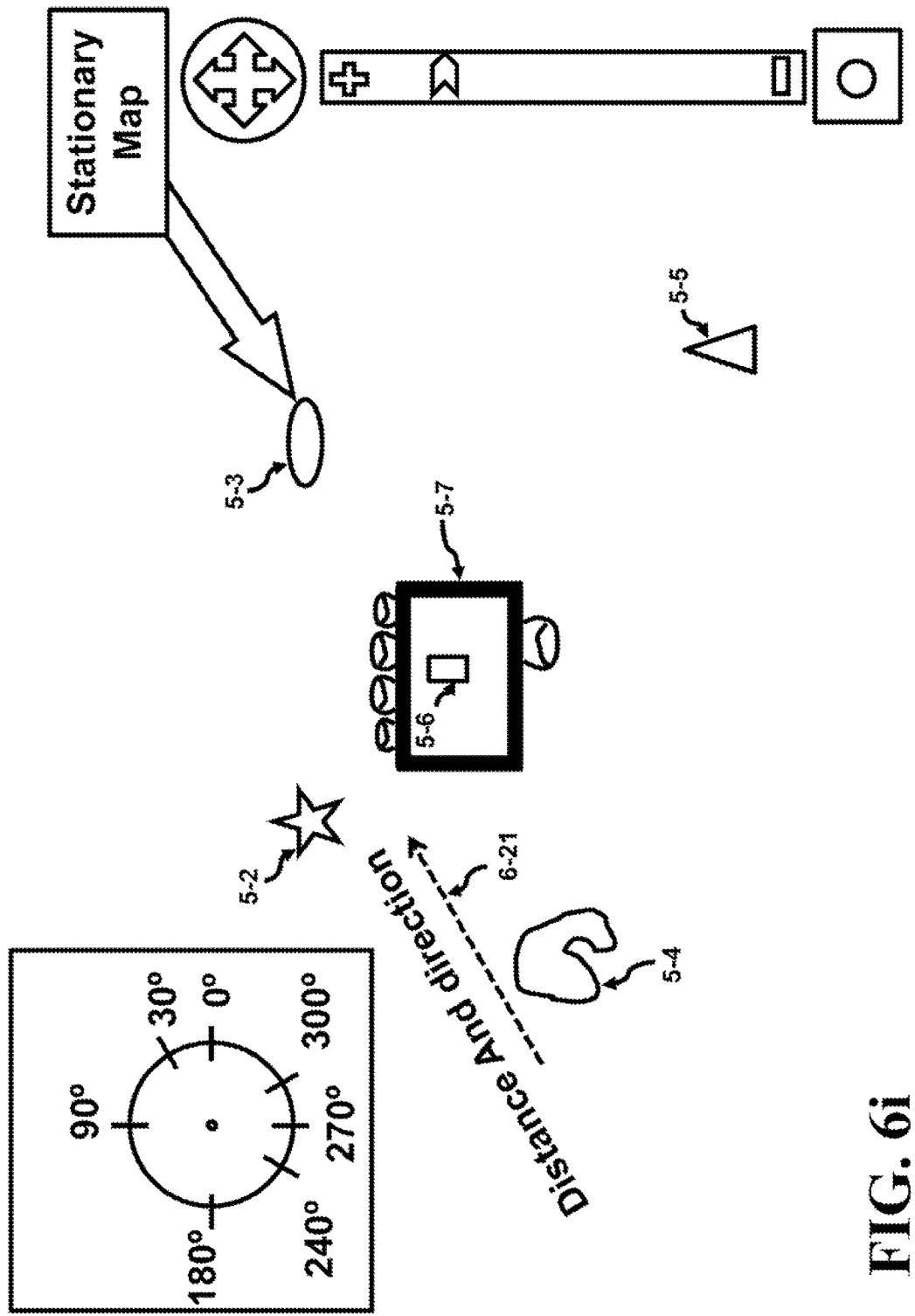
FIG. 6i presents an eighth sub-scale portion of the representative map of FIG. 5a that can be viewed on the screen of a portable hand held device after the portable hand held device is physically moved in accordance with the present invention.

In FIG. 6i, the user has stopped at the rectangular object 5-6 which is displayed on the screen of the portable unit 5-7. The distance between the object 5-4 and the rectangle 5-6 is indicated by the vector 6-21 which shows the distance and direction. Note below the slider, the box with the circle indicating the movement has stopped since now the user is observing the rectangle and its local environment.

Figure 6J:
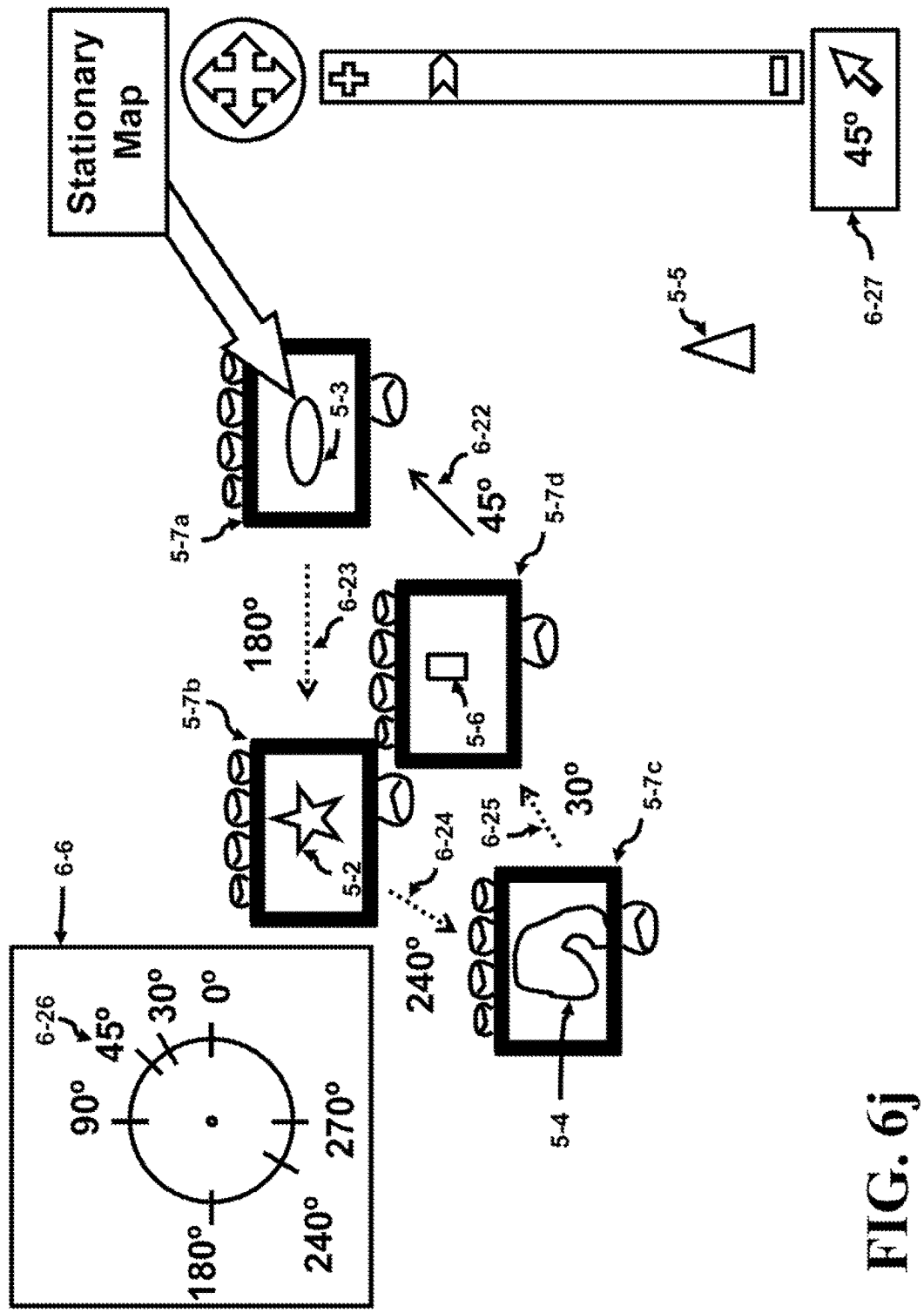
FIG. 6j depicts the first, fourth, sixth and eighth sub-scale portions of the representative map of FIG. 5a that can be viewed on the screen of a portable hand held device after the portable hand held device is physically moved to these locations in accordance with the present invention.

In FIG. 6*j*, the screen of the portable unit 5-7*d* has been moved 45° along vector 6-22 to display the oval 5-3 within the display 5-7*a*. The Sliding Window identifier 6-27 below the slider presents the direction of movement of the unit by the arrow at 45°. Recapping, moving along the 180° dotted arrow 6-23, the screen of the portable unit 5-7*b* presents the Star 5-2. Moving along the 240° clotted arrow 6-24, the screen of the portable unit 5-7*c* views the object 5-4. The screen of the portable unit 5-7*d* can then return to the rectangle 5-6 by moving the unit along the 30° dotted arrow 6-25.

The innovative embodiment allows these distances and angles along the stationary map to be related to the movement of the screen of the portable unit by the user's hand. The physical movement of the portable unit in physical space is bonded to the stationary map in the user's mind. This allows the user to easily relate to the stationary map and allows the user to visualize and "feel" where the various locations are within the map in a physical sense.

Figure 7A:
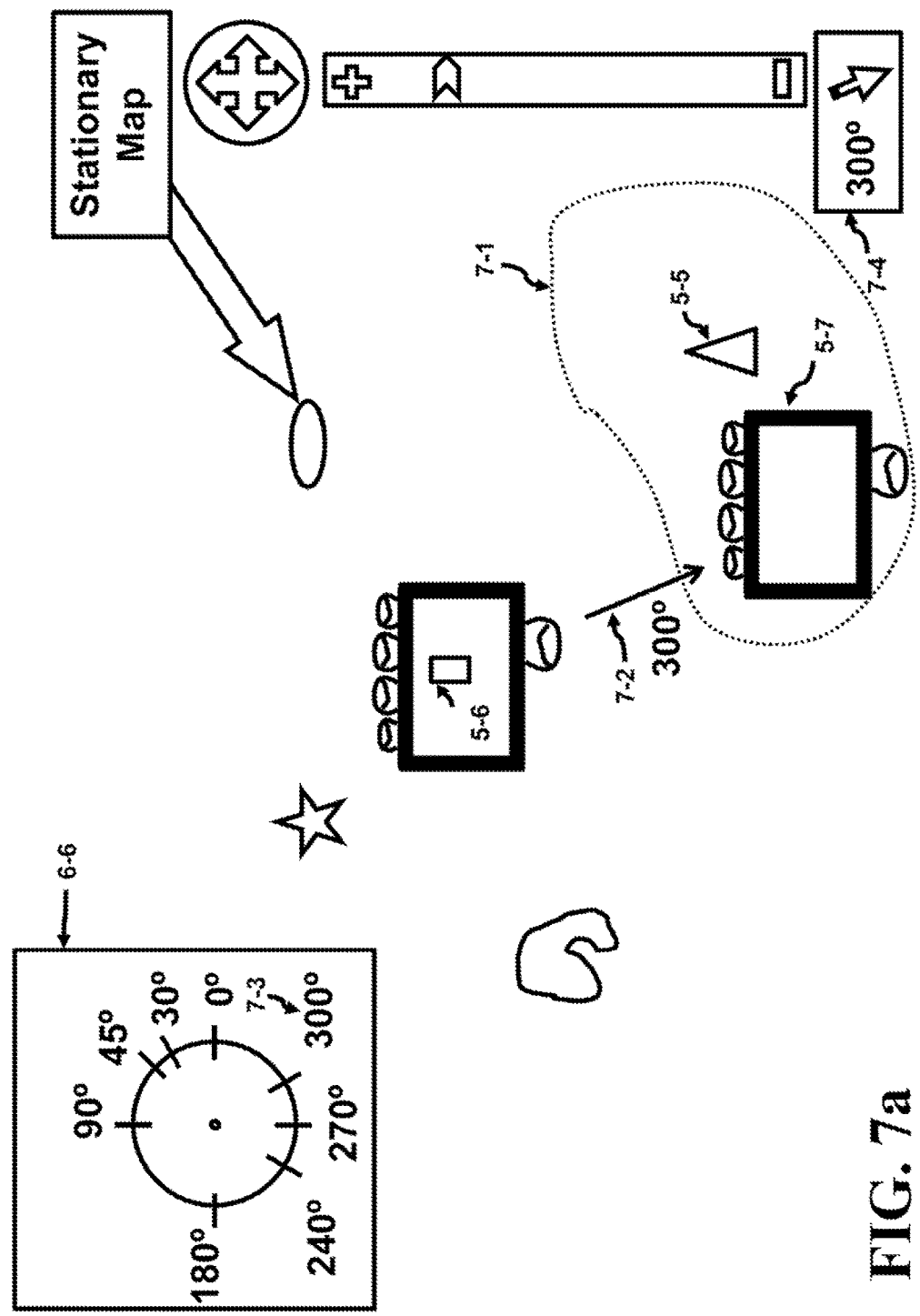
FIG. 7a-d shows a search process to find a particular sub-portion of the representative map of FIG. 5a that can be found on the screen of a portable hand held device after the portable hand held device is physically moved in accordance with the present invention.
Figure 7B:
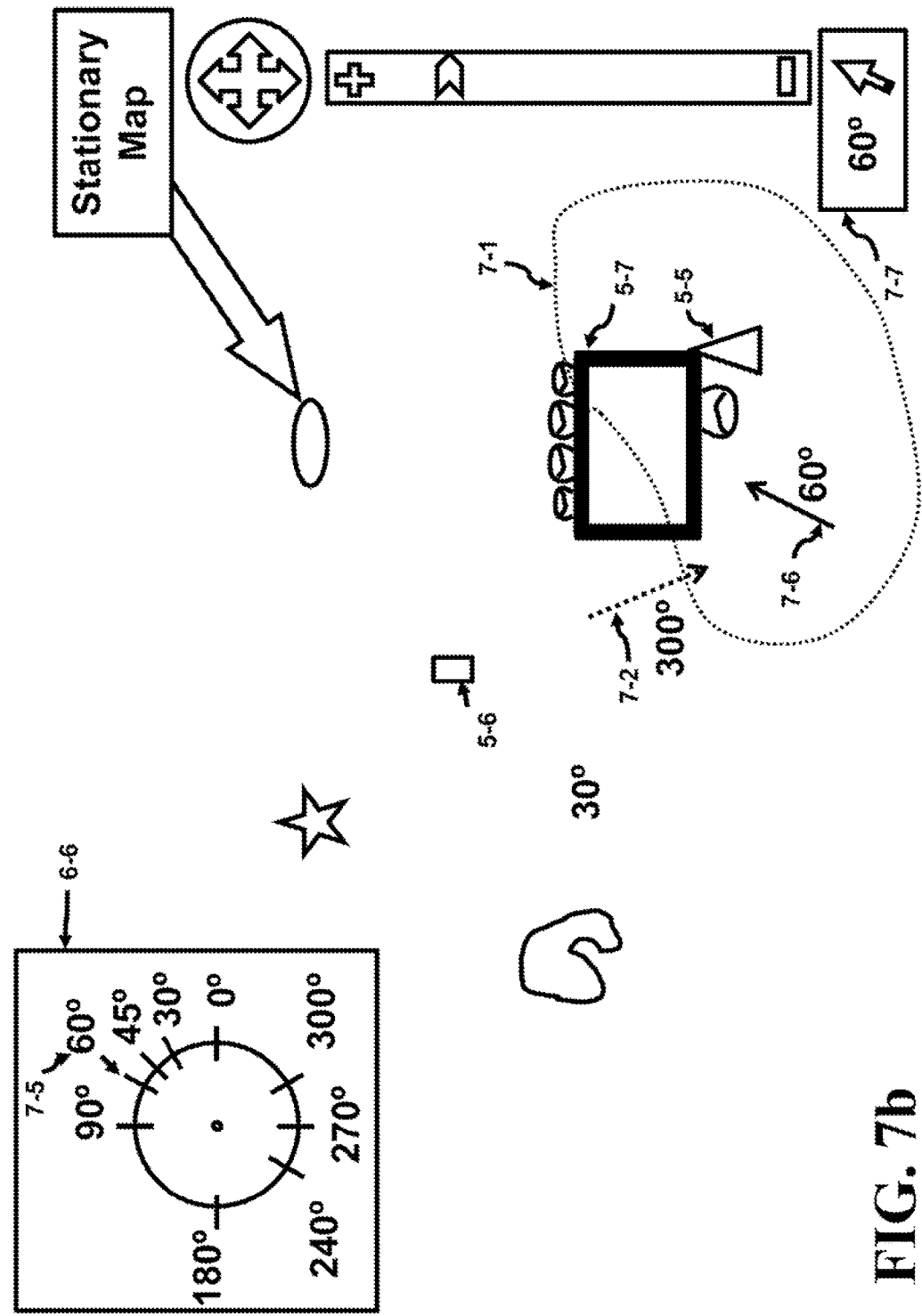

This relation of the physical sense to the stationary map can be used to search and find an object that may be further away. Let's assume that the screen of the portable unit 5-7*d* is observing the rectangle 5-6 and that the user remembers that there was a triangle 5-5 in the map. The user knows that the triangle 5-5 was located to the lower right somewhere in the 5 o'clock direction. However, the exact location of the triangle 5-5 now needs to be searched since the user knows that the triangle is within the region 7-1 as illustrated in FIG. 7*a*. The first intention of the user is to move the screen of the portable unit 5-7 about 300° along the vector 7-2. According to the compass 6-6, a new angle take 300° 7-3 is placed on the circle. Below the slider is the Sliding Window identifier 7-4 illustrating the direction of the portable unit and its angle of 300°. In FIG. 7*b*, the user moves the screen of the portable unit 5-7 about 60° along vector 7-6 which adds a new tick 7-5 to the compass. Beneath the slider the Sliding Window identifier 7-7 indicates the arrow which presents the direction the user is moving the display and the degrees of 60°. Not finding the object of interest the triangle 5-5, the user continues the search.

Figure 7C:
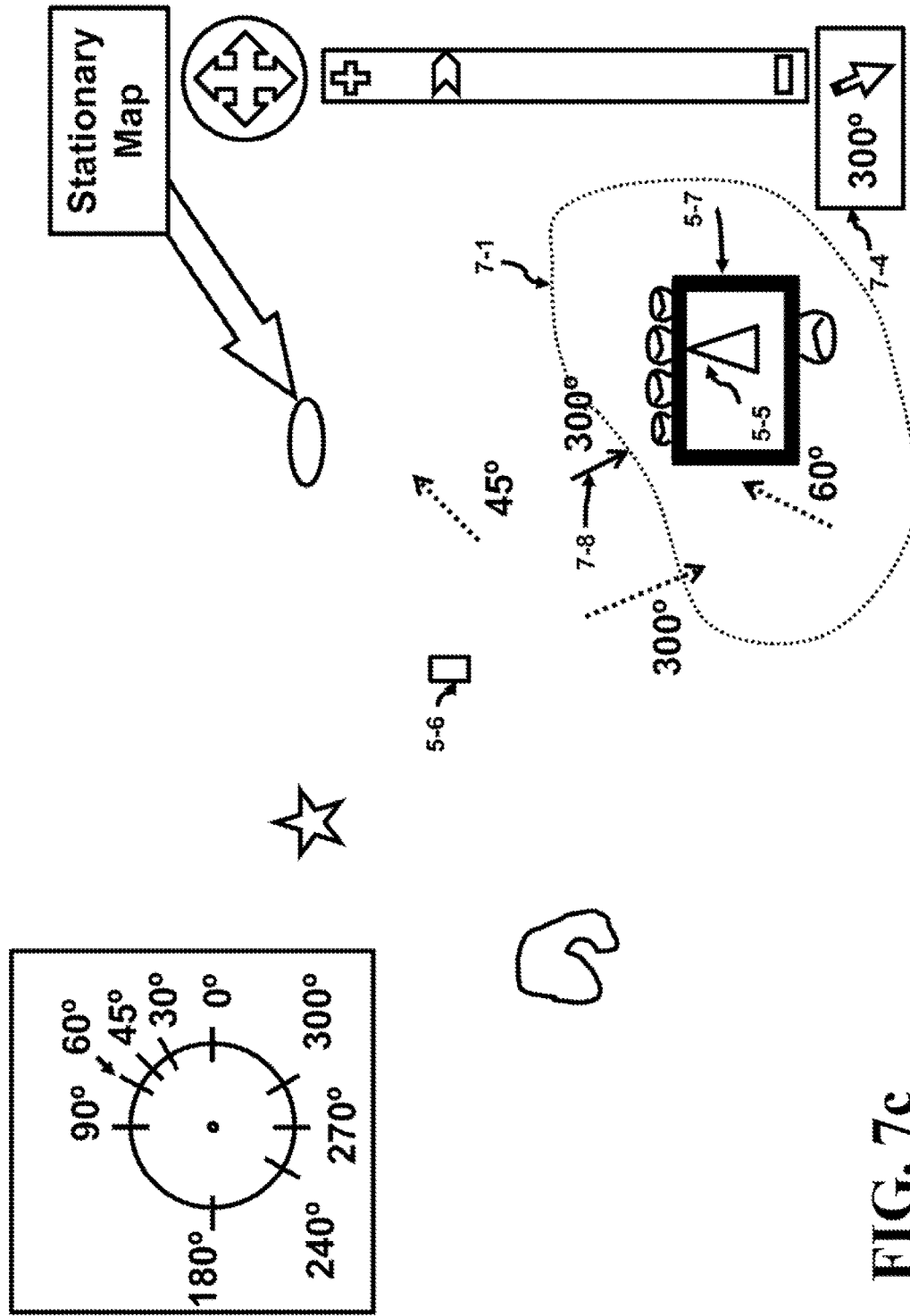
Figure 7D:
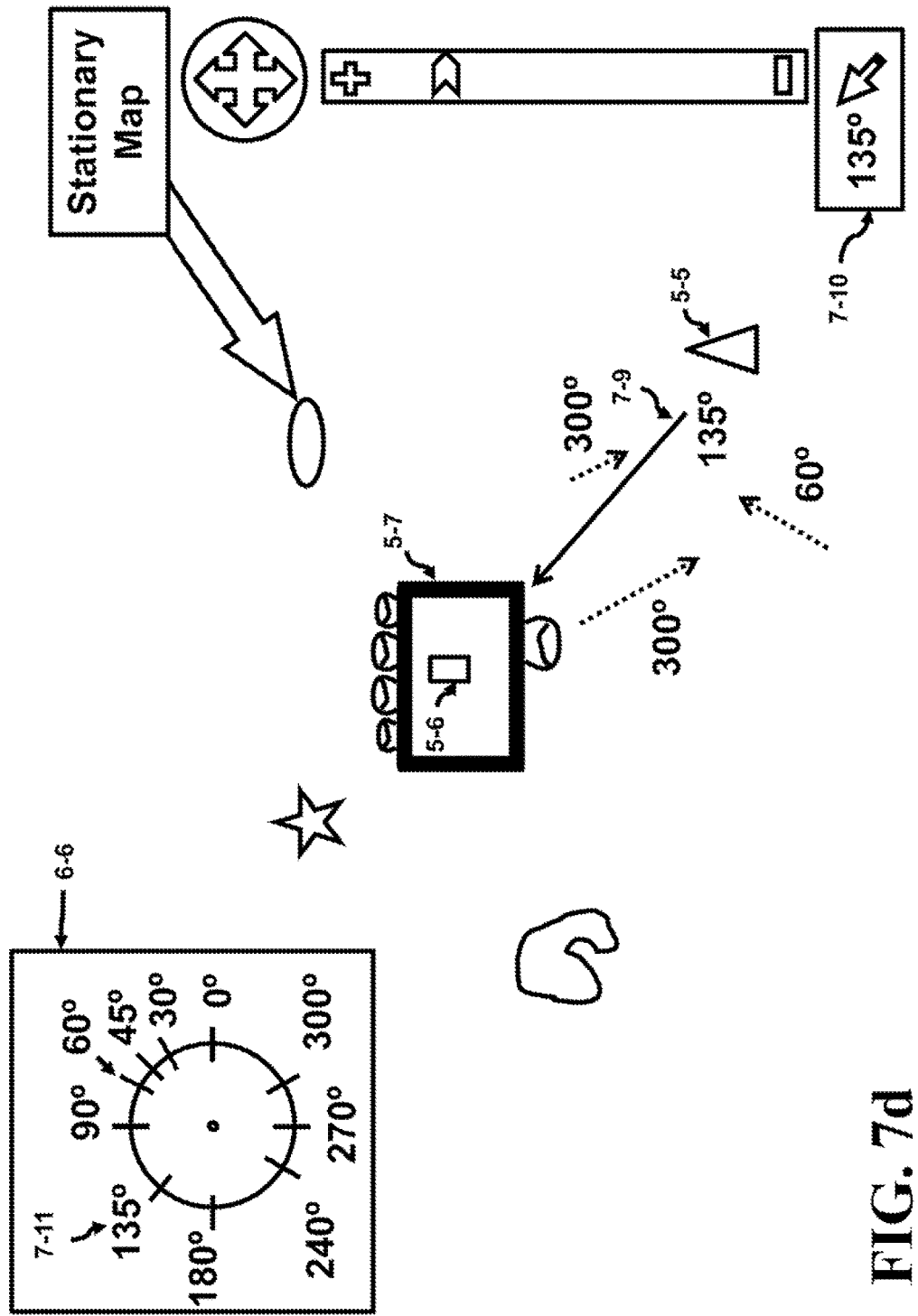

In FIG. 7*c*, the user moves the screen of the portable unit 5-7 about 300° along vector 7-8 to finally position the triangle 5-5 in the screen. The Sliding Window identifier 7-4 indicates the direction the user moved the portable device by the arrow at 300°. Once the user finds to triangle 5-5, it is a very easy matter to come back to the rectangle 5-6 since that was the starting point along vector 7-9 as illustrated in FIG. 7*d* and the Sliding Window identifier 7-10.

Getting back to the origin (reference point) can be easily verified by the reader, by placing their hand in front of their face, which indicates the (0, 0) location (origin) that would correspond, for example, to where the rectangle 5-6 is located. Now move your hand to different locations within the plane perpendicular before you and one finds that one can always return to the (0, 0) location. Thus, even if the user gets lost searching for an object, the user can always return back to the origin. After finding the triangle 5-5, the process of returning to the origin is straightforward. To return back to the starting point of the where the rectangle 5-6 is located; the user merely moves their hand back in the center of his face. Thus, the reference point of 5-6 illustrating where the rectangle is easy to reestablish and present on the screen of the portable unit since the origin is located at the central common comfortable point of the user.

Figure 8A:
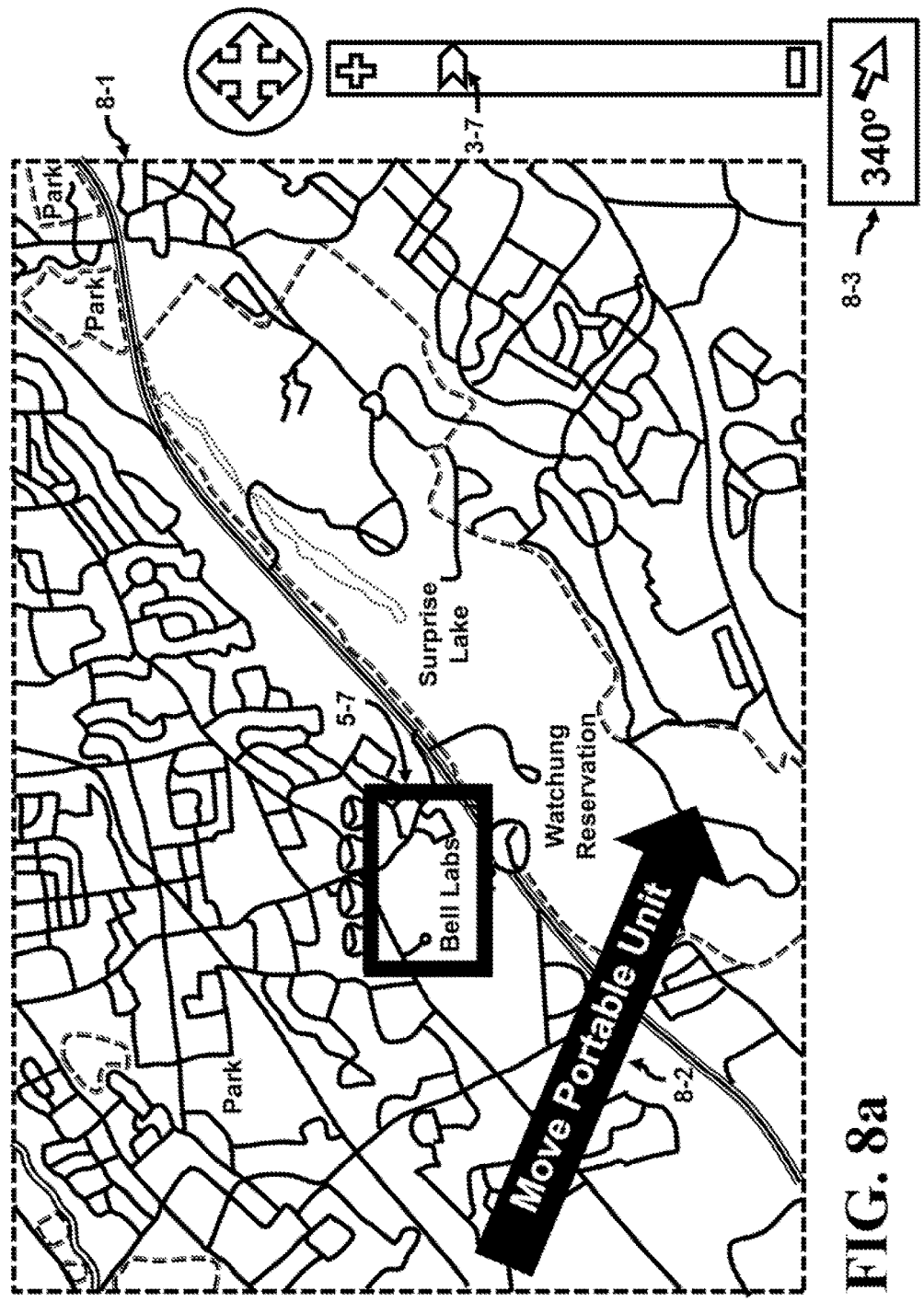
FIG. 8a presents the first sub-portion of the map in FIG. 3a that can be viewed on the screen of a portable device when the scale is magnified in accordance with the present invention.
Figure 8B:
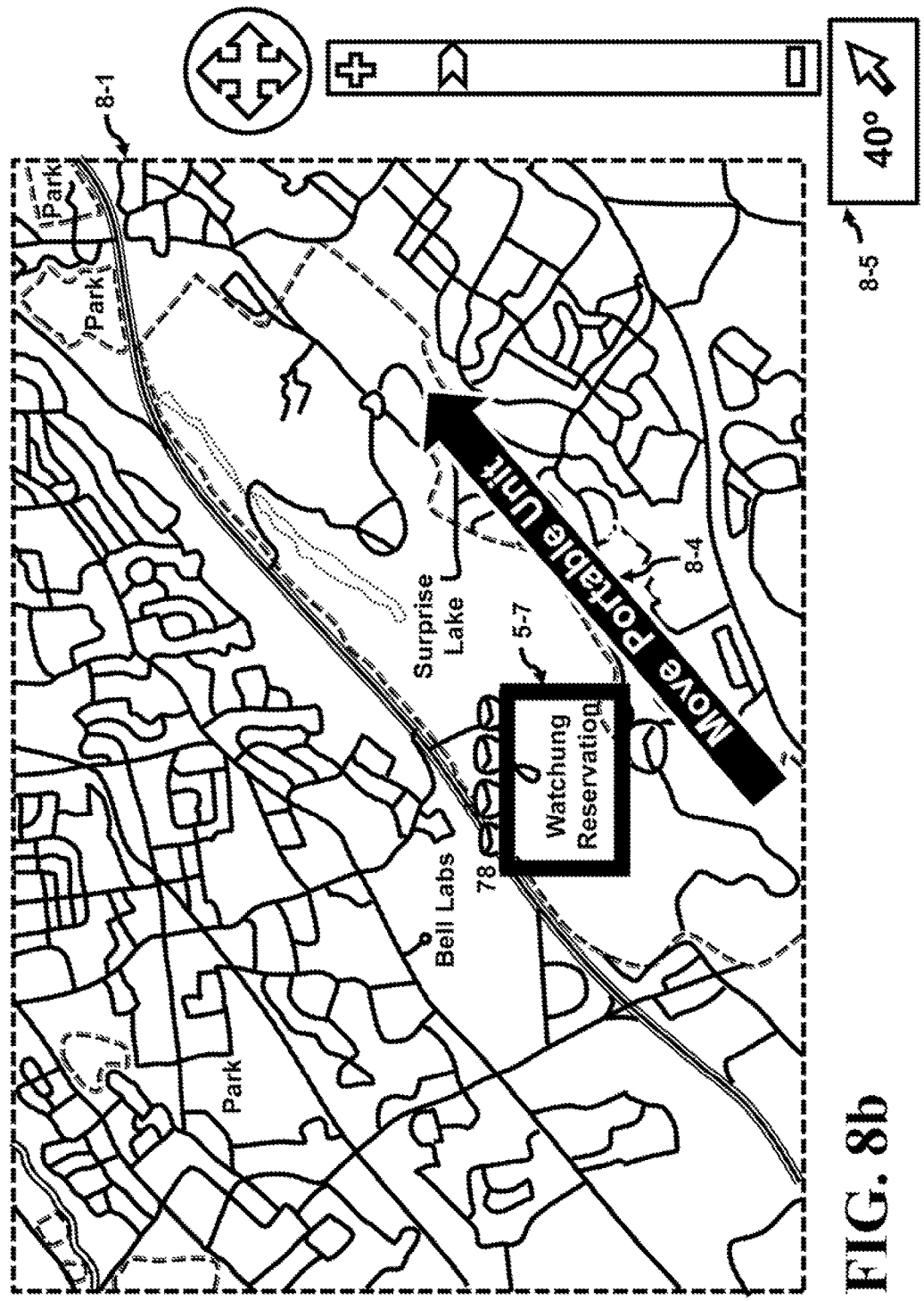
FIG. 8b depicts the second sub-portion of the map in FIG. 3b that can be viewed on the screen of a portable device when the scale is magnified and the portable device has been physically moved in accordance with the present invention.
Figure 8C:
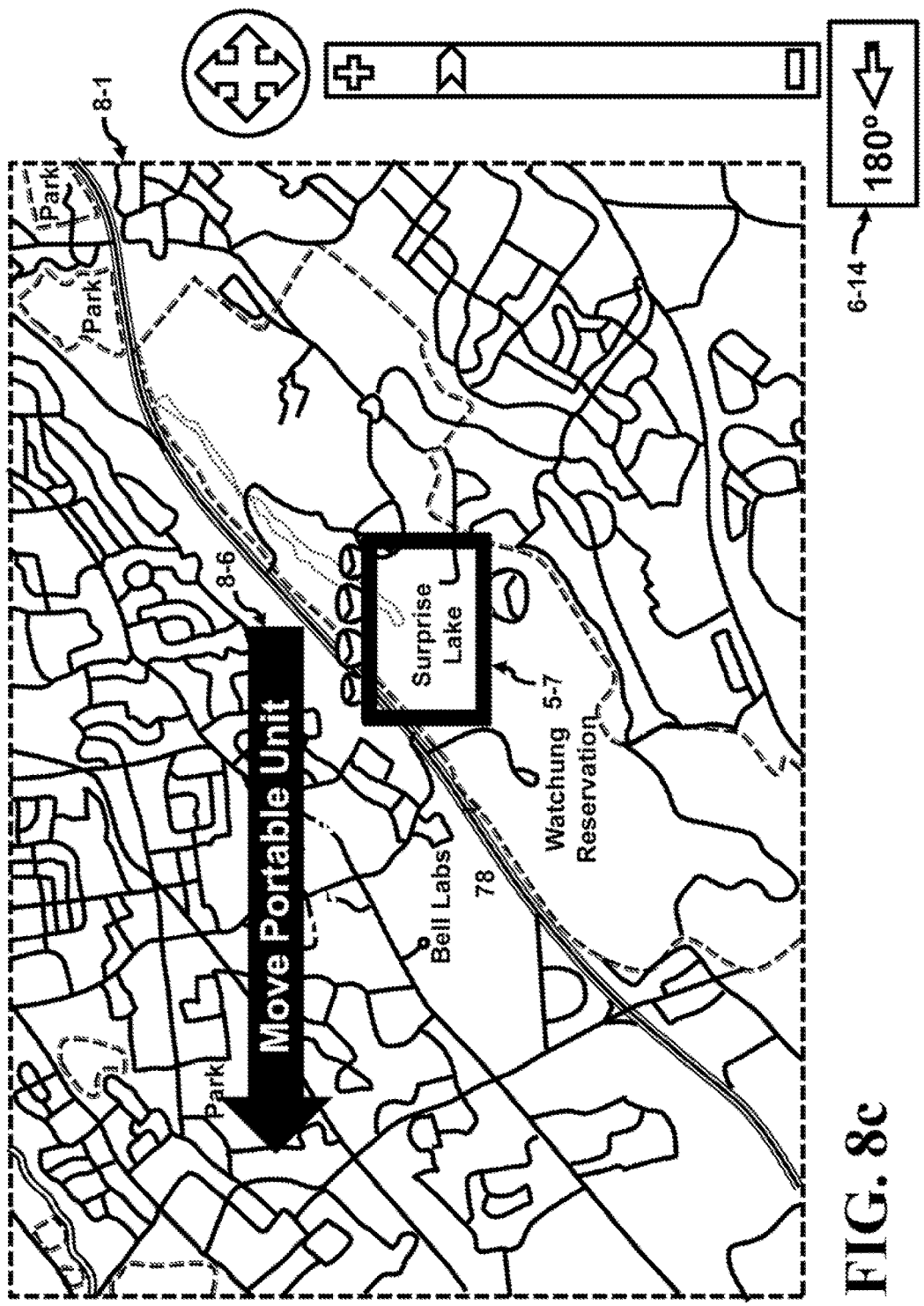
FIG. 8c illustrates the third sub-portion of the map in FIG. 3c that can be viewed on the screen of a portable device when the scale is magnified and the portable device has been physically moved in accordance with the present invention.
Figure 8D:
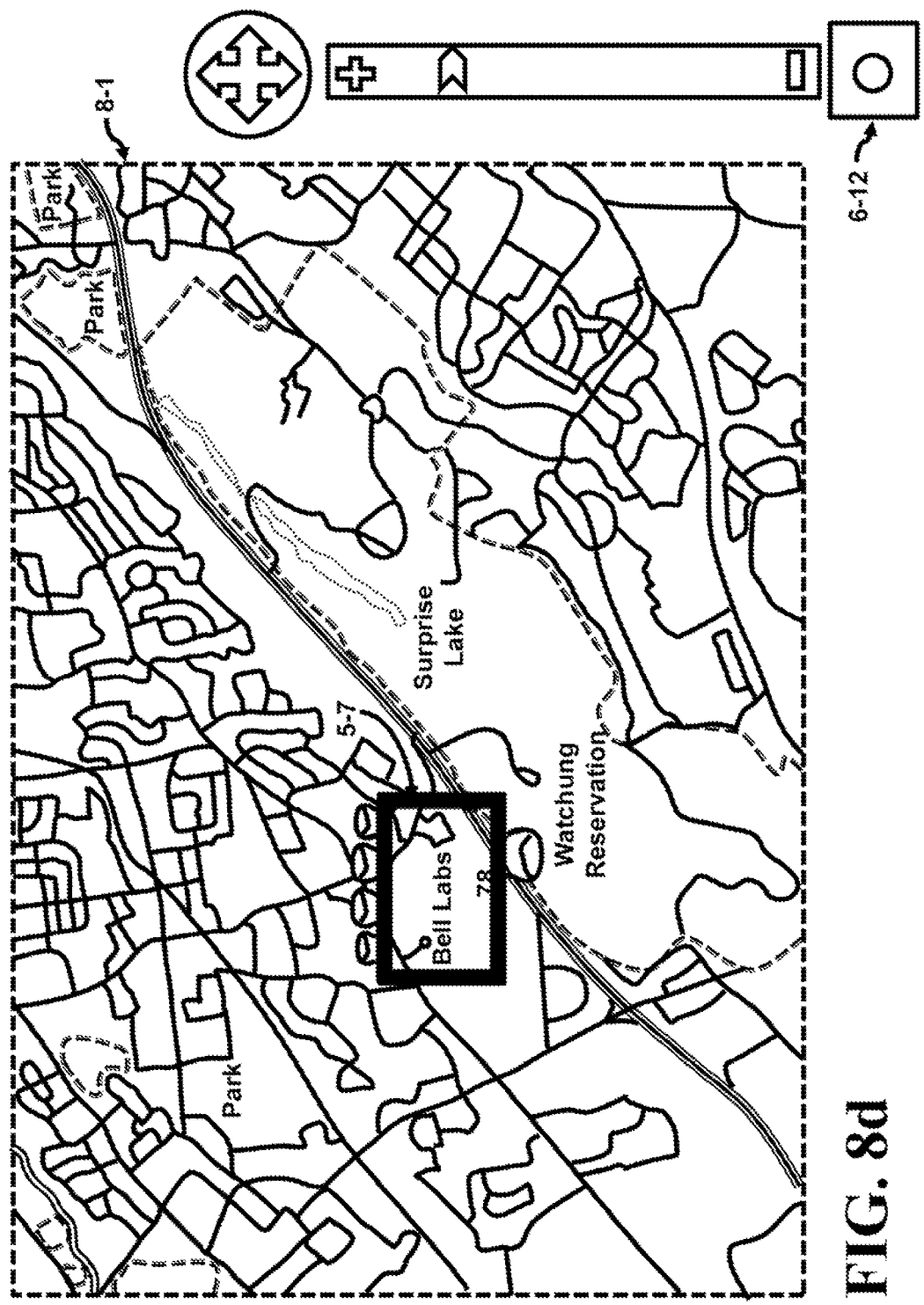
FIG. 8d shows the first sub-portion of the map in FIG. 3a that can be viewed on the screen of a portable device when the scale is magnified and the portable device has been physically moved to the initial position in accordance with the present invention.

This technique of maintaining the bitmaps stationary and only moving the portable device can be applied to the map of Bell Labs, the Watchung Reservation and Surprise Lake that was investigated earlier. In FIG. 4*a-c* the map was moved while the screen of the portable unit 5-7 was maintained stationary. In FIGS. 5-8, the map remains stationary and the screen of the portable unit is moved. In FIG. 8*a*, the starting point or origin would be Bell Labs as indicated on the screen of the portable unit 5-7. The user moves the portable unit in the direction of the move portable unit arrow 8-2. The background image of a stationary map 8-1 exists in a database and as the portable unit moves, memory buffers are filled by the database to present to the user the map corresponding to the distance and angle to where the portable unit was displaced. Furthermore, as the portable unit is moving in a particular direction, the memory components corresponding to that direction are pre-fetched for quicker loading into the memory or cache. The Sliding Window identifier 8-3 as illustrated below the scale corresponds to 3400 movement. In FIG. 8*b*, the user is viewing the Watchung Reservation on the screen of the portable unit 5-7 and decides to view Surprise Lake. Remembering where Surprise Lake was earlier, the user moves the physical device in the direction of the move portable unit arrow 8-4. The Sliding Window identifier 8-5 as illustrated below the scale corresponds to 40° movement. In FIG. 8*c*, the screen of the portable unit 5-7, after viewing Surprise Lake, is now moved back to its initial starting position of Bell Labs. The user moves the physical device along the move portable unit arrow 8-6 and returns to Bell labs as illustrated in FIG. 8*d*. The user has returned the portable unit 5-7 back to Bell Labs once again and at this point this is the reference location or origin as indicated earlier which would be in a comfortable position before the user's face. In addition, the user has stopped the movement of the portable unit 5-7 as indicated by the identifier 6-12.

Figures 9A, 9B:
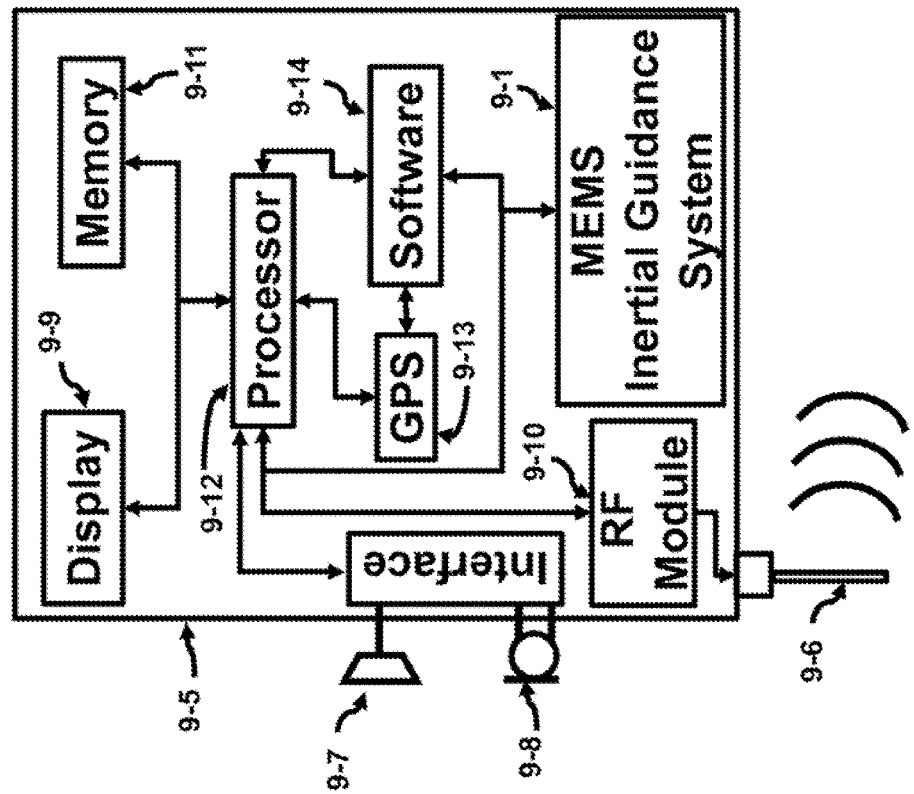
FIG. 9a presents the MEMS (Micro-electro-mechanical System) comprising an inertial guidance system in accordance with the present invention.
FIG. 9b depicts a block diagram of a handheld device including the inertial guidance system of FIG. 9a in accordance with the present invention.

An inertial guidance system 9-2 is illustrated in a MEMS integrated circuit 9-1 as depicted in FIG. 9*a*. Within the inertial guidance system are two boxes: the three axis accelerometer 9-4 and three axis gyroscope 9-3. The accelerometer senses the current acceleration of the portable unit along the three axes in distance per unit time. The gyroscope determines the current device orientation with respect to the three axes. The screen of the portable unit is displaying a map at a given scale with the origin of the map at the center of the screen. The user decides to view the region to the upper right of the map. The user moves the portable device into that physical space. Once the portable unit is moved, the information from the accelerometer and gyroscope sensors is applied to a microprocessor. In addition, the microprocessor uses the current scale of the map. The microprocessor calculates (based on the acceleration, orientation scale of the map, and origin position) the new position of the map that should be displayed in the center of the screen of the portable unit. The microprocessor issues instructions to the memory to provide the data corresponding to the newly calculated position. The data from the memory is processed and applied to the screen of the portable unit. The map corresponding to the new position is viewed on the screen by the user to provide the user with information regarding the contents of the map. The map corresponding in scale to where the screen of the portable unit currently is positioned. Since the processor calculation and memory access can occur in microseconds, the screen can display the contents of the new region almost instantaneously to the user. Thus, the map that is displayed to the user on the screen of the portable device provides map information that is tightly bound to the positional location of the portable unit. This provides the user with an intuitive feeling of the positions of the objects in the map to the physical positions of portable unit to the user. The system behaves as if a stationary map exists behind the portable unit and the screen of the portable unit is a Sliding Window exposing the portion of the image of the stationary map behind the portable unit.

As the user moves the portable unit, the movement is sensed by the inertial guidance system. This information provided by the inertial guidance system can be applied to a processor and an algorithm or a software program to determine the actual movement and relative direction of movement of the portable unit as the user moves the portable unit as indicated above. This information is used to display the correct portion of the stationary background map on the screen.

The interaction of the movement of the portable unit can be performed in a two dimensional plane (along the plane of the screen) or in a three dimensional space (along the plane of the screen and perpendicular to the screen). The term directional distance is a vector which has a vector representing distance and direction. In two dimensions, the vector would have distance and an angle measured to a reference axis. In two dimensions, the directional distance can be R (distance) and Theta. In a three dimensions, the system is usually described in the Cartesian system (X, Y and Z axes), although the cylindrical (P, Phi and Z) or spherical (R, Phi, Theta) systems may be appropriate if the map has the right symmetry. For instance, the directional distance in three dimensions can be defined as R (distance) and two angles: Phi angle and Theta angle. However, before interacting with the memory, all coordinate systems need to translated to the Cartesian system since the memory array would typically be arranged using the Cartesian system. A narrower term perpendicular distance implies the perpendicular distance from a surface of a plane. The magnitude of direction is the distance between two points on a map. The map could also be an image, an object or any bitmap. In addition, a two dimensional cross section would be the image of slicing an object with a plane. This image would contain the outline of the object.

The three dimensional system uses a vector that has a directional distance as in spherical coordinates. The Phi and Theta degrees are also used. These spherical coordinates can be translated into Cartesian coordinates when needed. The perpendicular displacement of the portable unit allows a map that is being viewed to represent a three dimensional structure, for example, a city with building where each building has several floors.

In FIG. 9b, a more detailed block diagram of the portable unit is presented. This unit has an antenna 9-6 coupled to an RF module 9-10. The RF module is coupled to the processor 9-12. An interface block that has a speaker 9-7 and a microphone 9-8 is coupled to the processor 9-12. The processor 9-12 is also coupled to a display 9-9, a memory 9-11, a GPS (Global Positioning Satellite) 9-13 and software block 9-14. The MEMS inertial guidance system 9-1 is coupled to the processor and to the software block to evaluate the movement of the portable handheld unit. The inertial guidance system provides movement data to a microprocessor and the microprocessor calculates the angle and the distance of the movement using the software block. An external memory or database can be used to store a portion of the image of a stationary map. An RF module 9-10 and antenna 9-6 can access an external database to supply the memory with data for the image of a stationary map. The GPS can, if desired, provide geographical locations data such as latitude and longitude.

FIG. 10a and FIG. 10b illustrate the difference between the two systems of when the map is moved and when the device is moved. In FIG. 10a, the map 10-1 is moved while the portable unit 4-2 remains stationary. When the map is moved as indicated by the arrow in FIG. 10a, the screen of the portable unit 4-2 remains stationary and displays the map as it is slid to the lower left exposing the upper right portions on the screen of the portable unit. The map 10-1 exists in a memory or a fast cache. These memories may need to be replenished by a database as the map presents itself to the screen of the portable unit. The movement of the map is accomplished by depressing the movement control 3-2 by a finger 3-3. Other means of sliding the map include a touch screen where a finger sliding on the face of the screen or display drags the map. The table beneath indicates three aspects of the sliding map movement. First, the device remains stationary. Second, the movement of the map is done in increments and any scale associated with it to provide an intuitive grasp to the user of dimensions is lost. And lastly, because of this the map movement lacks an intuitive "feel to the user" as to regards to the distance and angles the map has been slid. With regards to the last item, the user cannot use his experience to easily identify where they have been and how to get back.

In contrast, FIG. 10b shows the innovative embodiment of the device movement technique. The compass 6-6 shows the movement of 45° of the device or portable unit 5-7 is moved in the direction of the arrow 10-4. The screen of the portable unit 5-7 moves to the upper right and displays the stationary map on the screen of the portable unit. Thus, the user moves the portable unit 5-7 in the direction 10-4 while the map 10-3 remains stationary. The innovative device movement presents three aspects. The first is that the map 10-3 remains stationary. The second aspect is that the movement of the portable unit 5-7 directly correlates to dimensions of the map 10-3. This is a big advantage since now as the user moves the portable unit; the distance that the user moves the portable unit through is related directly to the distance (at a given scale) of the map 10-3. Thus, the movement of the device or portable unit directly correlates with the map dimensions. Lastly, the movement that the user experiences allows the user to "feel" and grasp the various locations by various positions in physical space. This provides for this innovative distance and angle understanding of the map 10-3 which remains stationary and is being scanned by the moving portable unit 5-7.

Two flowcharts are illustrated. The first flowchart in FIG. 11a relates to the sliding of a map on the screen of a stationary unit. The second flowchart in FIG. 11b moves the screen of a unit across an image of a stationary map.

Figure 11B:
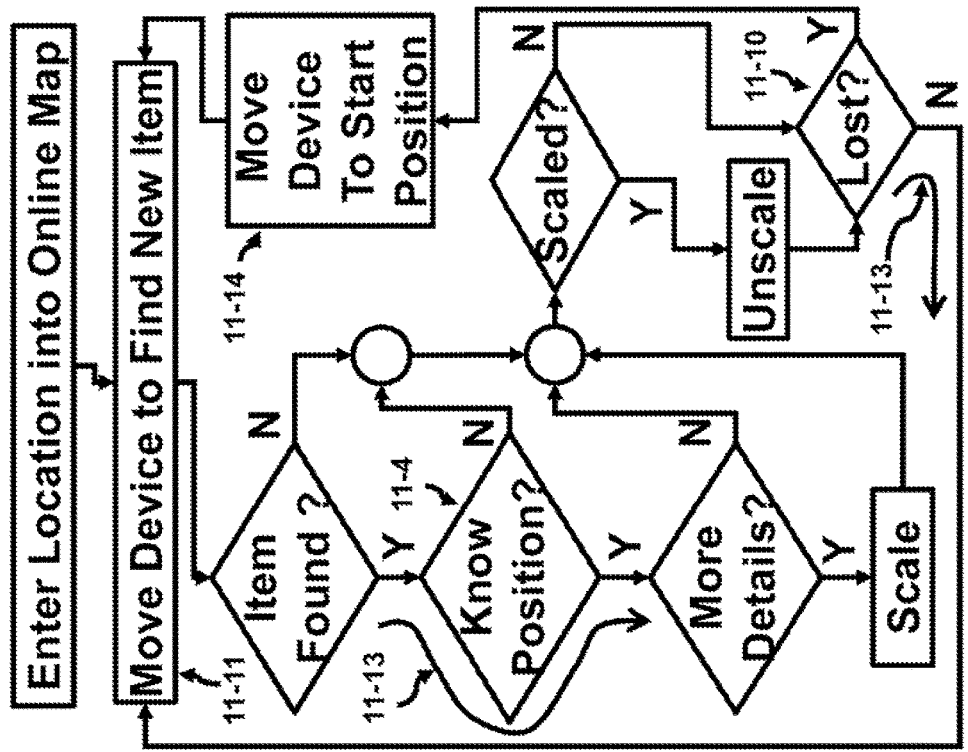
FIG. 11b depicts an inventive flowchart locating items in a map when the device or portable unit is moved in accordance with the present invention.
Figure 11A:
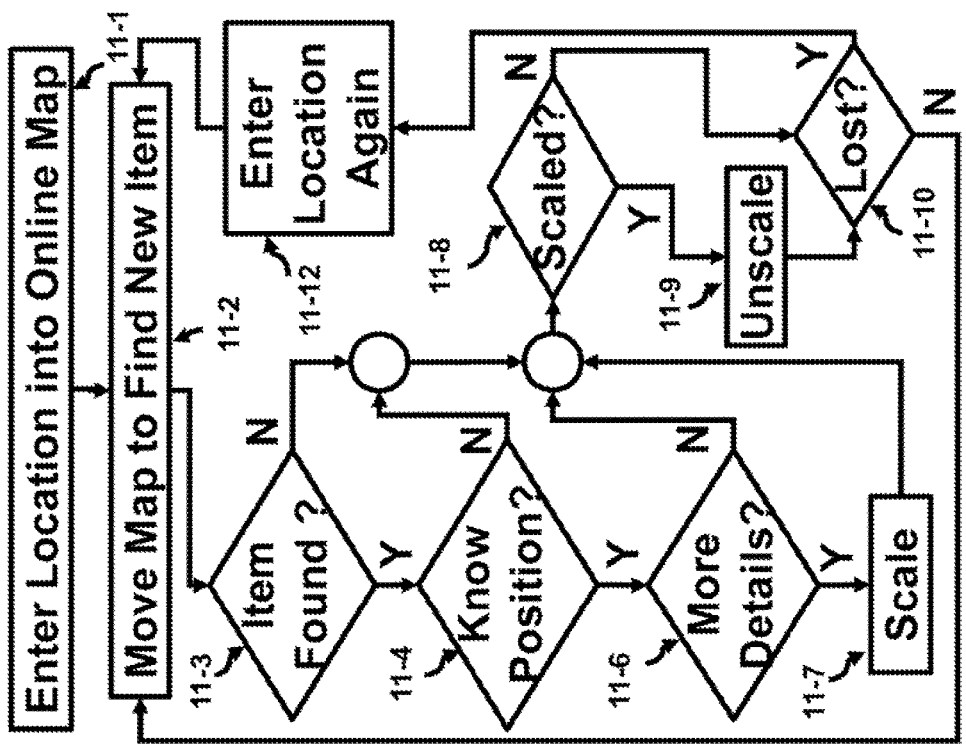
FIG. 11a presents a flowchart of locating items in a map when the map is moved in accordance with the present invention.

In FIG. 11a, the user enters the location into an online map 11-1. The user then moves the map to find a new item 11-2 and if the item is not found 11-3, then compensation is made if the map was scaled (11-8 and 11-9). If the user is lost 11-10 then the user should enter the location again 11-12 and repeat the previous steps. However, if the item had been found 11-3, and the user knew their position 11-4 and desired more details 11-6, then the map could be scaled to magnify the map 11-7. Once the user extracted the information desired, the map is un-scaled 11-9 and if the user is not lost 11-10, then the user could drag the map to find a new location 11-2.

In FIG. 11b, the user enters the location into an online map 11-1. The user then moves the device to find a new item 11-11 and if the item is not found, then compensation is made if the map was scaled. If the user is lost 11-10 then the user should move the device to the start position 11-14 and repeat the previous steps. However, if the item had been found, and the user knew their position 11-4 and desired more details, then the map could be scaled to magnify the map. Once the user extracted the information desired, the map is un-scaled and if the user is not lost, then the user could move the device to find a new item 11-11. In this flowchart where the device or portable unit is moved, the "feel" that the physical space provides indicates that the path through the known position decision 11-4 would typically follow the arrowed line path 11-13 since the user improves their chances of knowing the position or location. Similarly, the user will less likely be lost 11-10 and follow will the arrowed line path 11-13.

Figure 12:
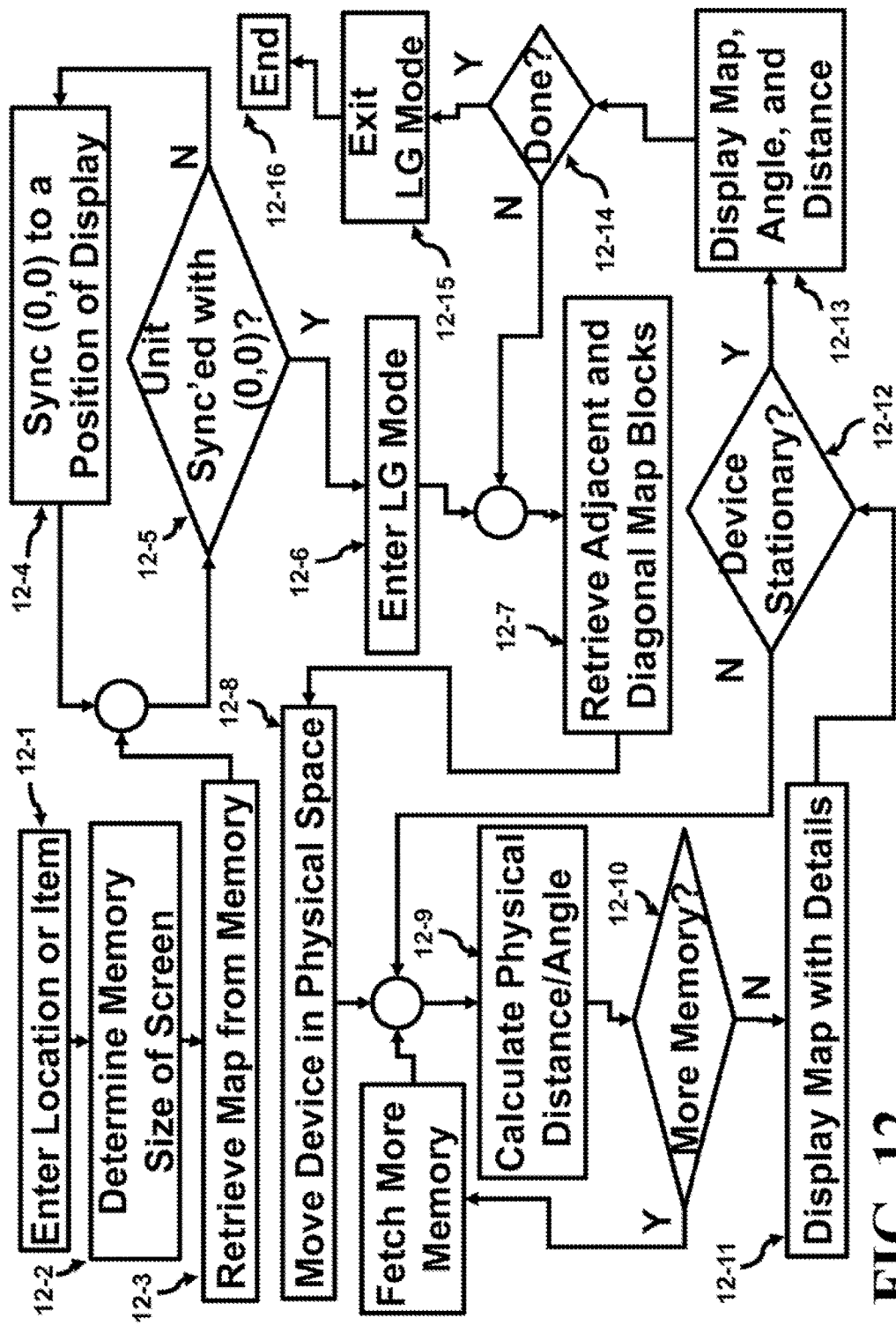
FIG. 12 illustrates a more detailed flowchart of the inventive portable device movement in accordance with the present invention.

FIG. 12 illustrates another flowchart. The user enters the location or item 12-1, the system then determines the memory size of the screen 12-2 and once the location or item is found, the system retrieves the map from memory 12-3 and then determines if the item is sync'ed (typically, in the center of the screen) and maps this point to the reference (0, 0) or origin. If the unit is not synced, the flow moves to box 12-4 which allows the user to sync the (0, 0) point to any particular portion of the screen or display. Once the unit is synced with the (0, 0), the user then enters the Sliding Window mode 12-6. The user moves into the retrieval of the adjacent and diagonal map blocks that are outside the field of view of the display 12-7. At this point with the memory being filled, the user can move the device in physical space 12-8 to view the stationary map. As the user is moving the portable device, the system is calculating the physical angles and distances 12-9 and transferring these measurements to the stationary map. This shows the user those items that were previously out of view and also prepares determining if more memory will be required, particularly if the portable device is moving in the same and constant direction. Thus, if more memory is required 12-10 the system fetches more memory and continues the calculation of the distance and angle measurement 12-9. If the memory is sufficient, the display continues showing the map with the details 12-11. If the user still maintains the device in motion 12-12 there may be a need to get additional memory. However if the device remains stationary, the user can display the map the angle and the distance from the starting point 12-13. IF the user is satisfied with the results of this particular search, and the user is done 12-14 and then can exit the Sliding Window mode 12-15 then terminate the process 12-16. However if the user wants to continue viewing the map, the user of the device can retrieve adjacent and diagonal map blocks 12-7 according to the direction that the user is moving returning the user back to moving the device in physical space 12-8.

Figure 13A:
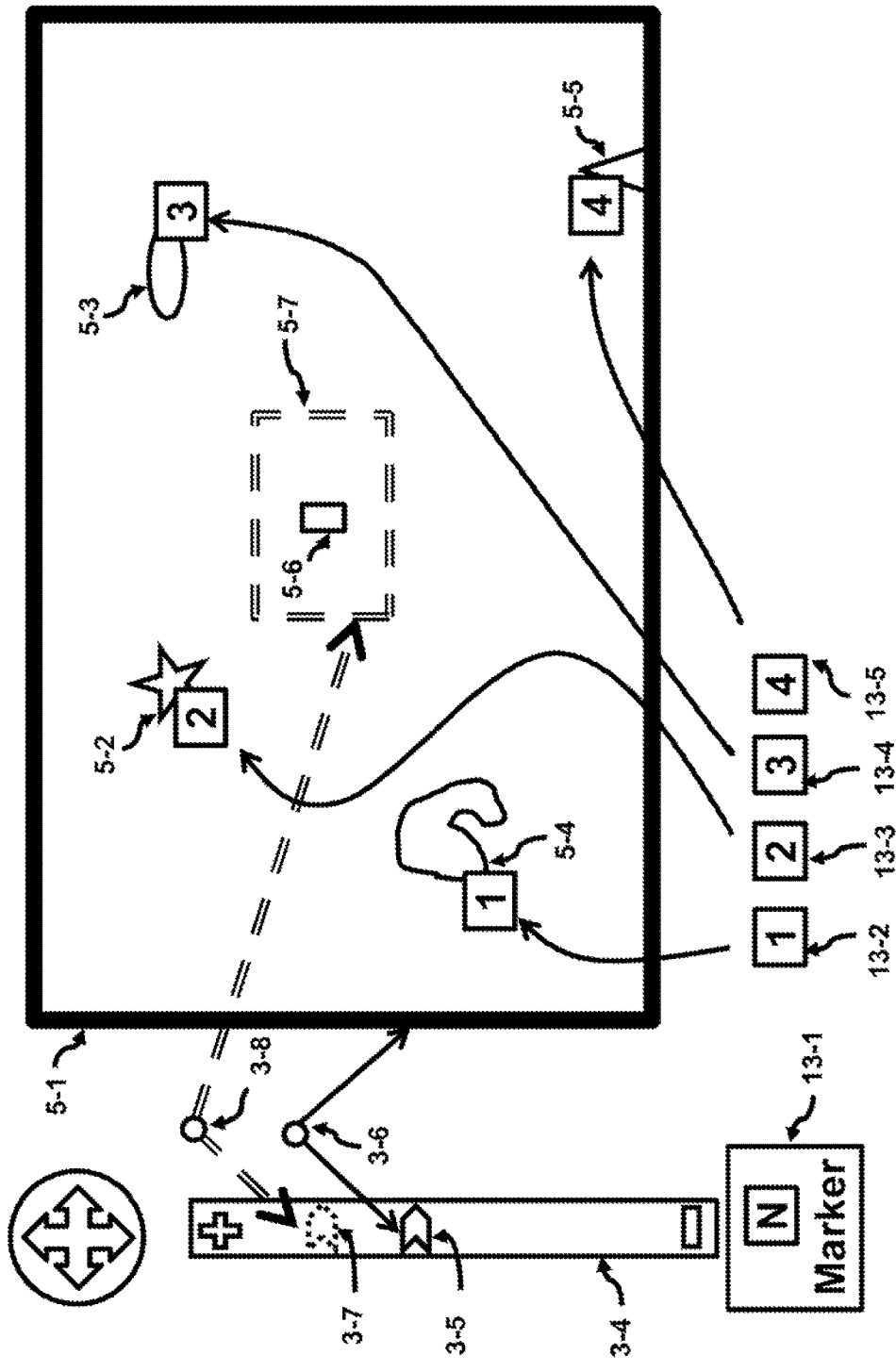
FIG. 13a shows the representative map where a large scale or a first sub-scale portion of the representative map can be viewed depending on the scale on the screen of a portable hand held device with the ability to place identifiers on various sub-portions in accordance with the present invention.

FIG. 13a illustrates yet another inventive embodiment of identifying where objects are when they are not in view within the display. The user usually starts by using a reduced magnification of the map to determine various adjacent aspects of the map. The map will be scaled down (decreased magnification) to see the adjoining components or adjacent members that the user may be interested in viewing. Once these components are located, the user may want to view these components at an increased magnification. For example, when the user uses the settings for the bubble 3-6 (the slide at 3-5 and screen 5-1) the screen of the portable unit 5-1 shows a large area image of a stationary map is presented to the user. This image includes the star 5-2, the oval 5-3, the object 5-4 and the triangle 5-5. In addition, in the very center it is a rectangle 5-6 which corresponds to the location of the (0, 0) or origin. When the user increases magnification according to the bubble 3-8 (the slide at 3-7 and 5-7) the rectangle 5-6 would remain within the screen of the portable device 5-7. Thus, when the slider is moved to location 3-7 corresponding to the bubble 3-8, the user has magnified or scaled positively the image of the stationary background map including the rectangle 5-6.

Figure 13B:
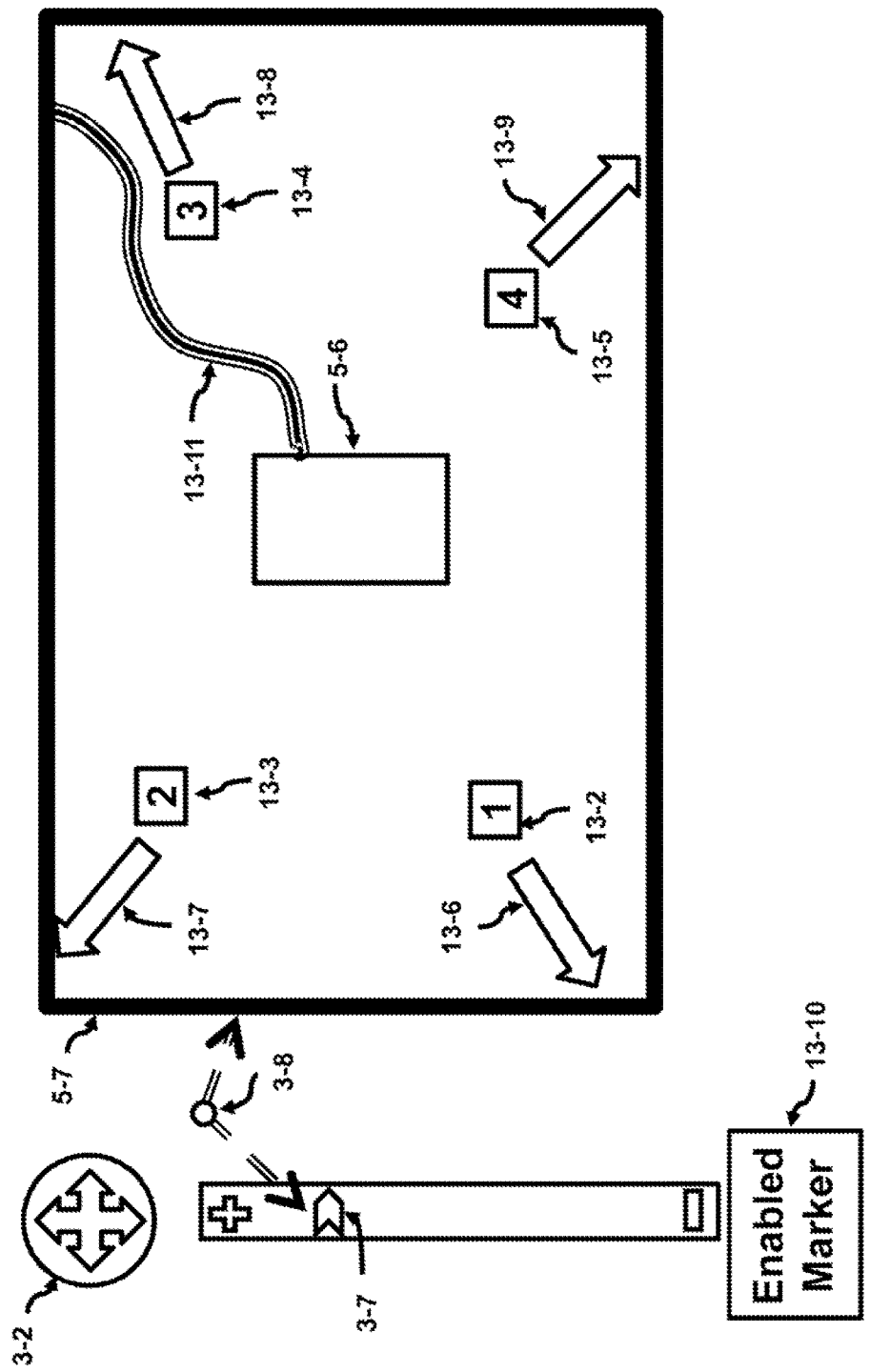
FIG. 13b presents the magnified first sub-scale portion of the representative map indicating the identifiers in accordance with the present invention.

However, before doing so the user can place location markers on the objects using the Marker identifier 13-1. The location markers can be letters, numbers, or shapes placed near the desired objects to be viewed. Other possibilities include placing the pointer of a mouse near the object and clicking, or verbally stating to location mark this point using vice recognition. For example, the location markers can be the squares 13-2 to 13-5 containing numbers. The number 1 marker is placed near the object 5-4; the number 2 marker is placed near the star 5-2, the number 3 marker is placed near the oval 5-3 and the number 4 marker is placed near the triangle 5-2. The portable unit can be either stationary or moving. Once the slider moves to 3-7 to give the relationship of 3-8, the rectangle 5-6 is magnified as depicted in FIG. 13b. The location marker identifier 13-10 indicates the system is enabled. After magnification, a road 13-11 becomes visible and the rectangle 5-6 has also been magnified. On this display screen 5-7 are those earlier location markers labeling corresponding arrows (or any equivalent symbols) to point to the matched objects in the screen in FIG. 13a. For example, to get to the number 1 marker 13-2 follow arrow 13-6, to get to the number 2 marker 13-3 follow arrow 13-7, to get to the number 3 marker 13-4 follow arrow 13-8 and to get to the number 4 marker 13-5 follow arrow 13-9. This inventive embodiment allows for the map to be moved by either the motion control 3-2 or by sliding a finger along the screen. An alternative embodiment would be to move the physical portable unit while keeping the map stationary. All of the arrows and location markers are transparent allowing the user to see the map beneath them. As the user moves the device to one of the identifiers, for example, in the direction of the arrow 13-6 corresponding to the number 1 marker 13-2, the three other arrows 13-7 through 13-9 continually adjust themselves to point to the current location of the other three objects. This innovative technique allows the user to mark locations, magnify the image of the map, and find all marked locations (without reverting to a lower magnification) by following pointers that direct the user to locations that are currently out of view of the screen. Furthermore, the user can find all marked locations without getting lost.

Figure 14:
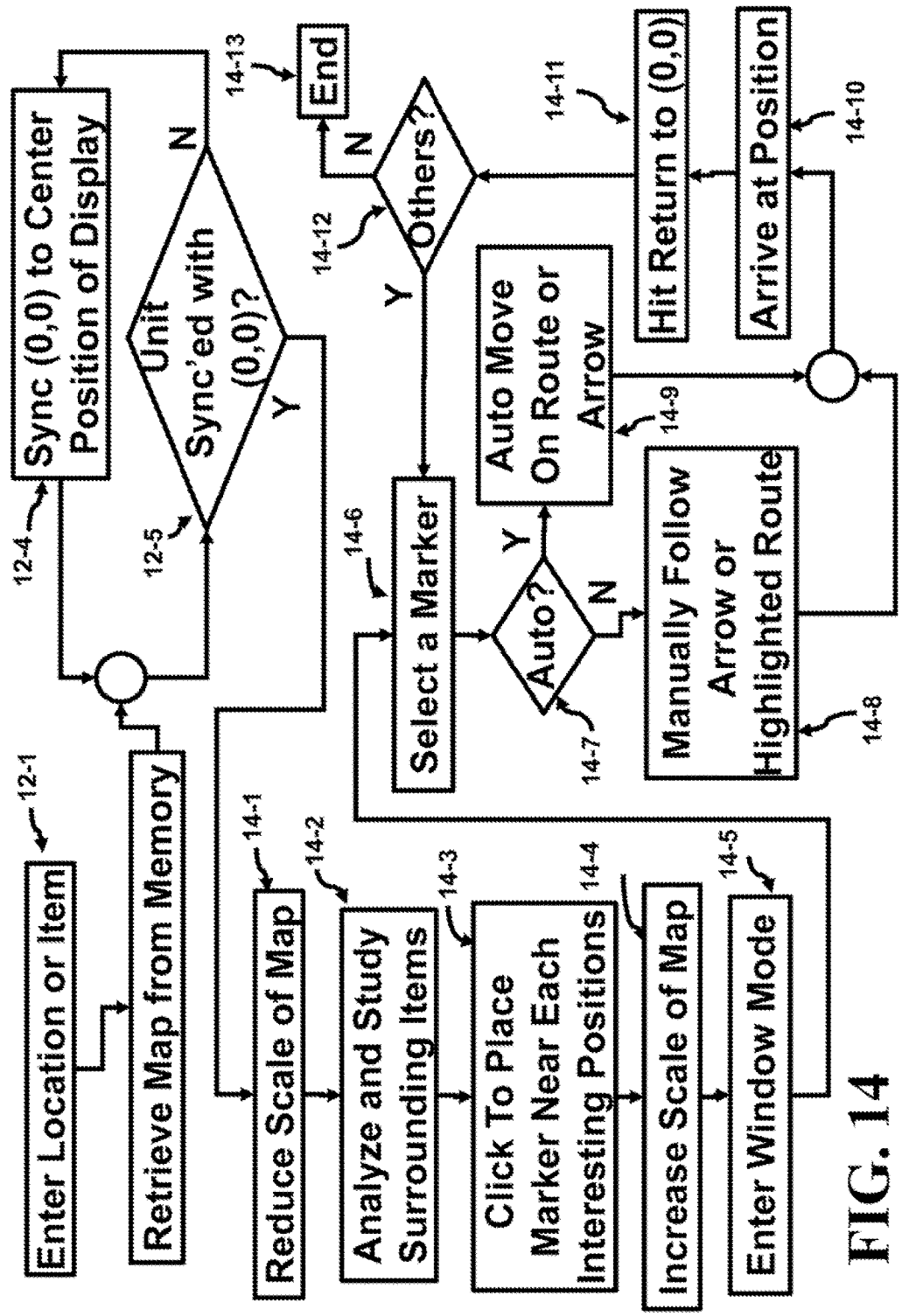
FIG. 14 depicts a flowchart of the inventive portable device movement follow the identifiers in accordance with the present invention.

FIG. 14 illustrates yet another flowchart. The user enters the location or item 12-1, the system then determines the memory size of the screen 12-2 and once the location or item is found, the system retrieves the map from memory 12-3 and then determines if the item is sync'ed (typically, in the center of the screen) maps this point to the reference (0, 0) or origin. If the unit is not synced, the flow moves to box 12-4 which allows the user to sync the (0, 0) point to any particular portion of the screen or display. Once the unit is synced with the (0, 0), the user then reduces the scale of the map 14-1. The user analyzes and studies items in the local area 14-2, clicks to place markers near the interesting positions or locations 14-3 (the positions can be marked with markers from a list, markers generated by the user, clicked and identified with a mouse click, clicked and voice activated), increases the magnification 14-4, enters the window mode 15-5 and then the user selects a marker 14-6. The user is given a choice 14-7: manually follow the marker 14-8 or let the system auto route to the marker 14-9. Once the user arrives at the position 14-10, and analyzes and extracts what they needed, the user returns to the origin 14-11. If the user still has other markers to view 14-12 then they select a different marker, or they terminate the search 14-13. As the user is moving the portable device or the map is being moved, the system is calculating the physical angles and distances and transferring these measurements to the identifiers of the remaining unviewed markers.

So far everything has been done in a two dimensional space (X and Y axes), the technique can also be extended to 3-D (three dimensional) space (X, Y and Z axes). Three dimensions (3-D) are important for the description of buildings, the layout of each floor in a building, study of molecular models, analyzing the internal structure of solid objects, etc. There can be several ways of viewing the 3-D space. For instance, the X and Y axes may be moved by touching and moving fingers across the screen while the third dimension of the Z axis is displayed by a movement of the portable unit. Another way is for all three dimensions to be activated by the movement of the portable unit in three dimensions. Yet another way is to use a touch screen to move in two dimensions and have a third temperature scale to move in the third dimension. Speech and voice recognition can be used to control the movement of the map, by stating for example, move left, move up, move down, move in, move out three units, etc. In addition, there can be many variations by combining the above methods.

Figure 15A:
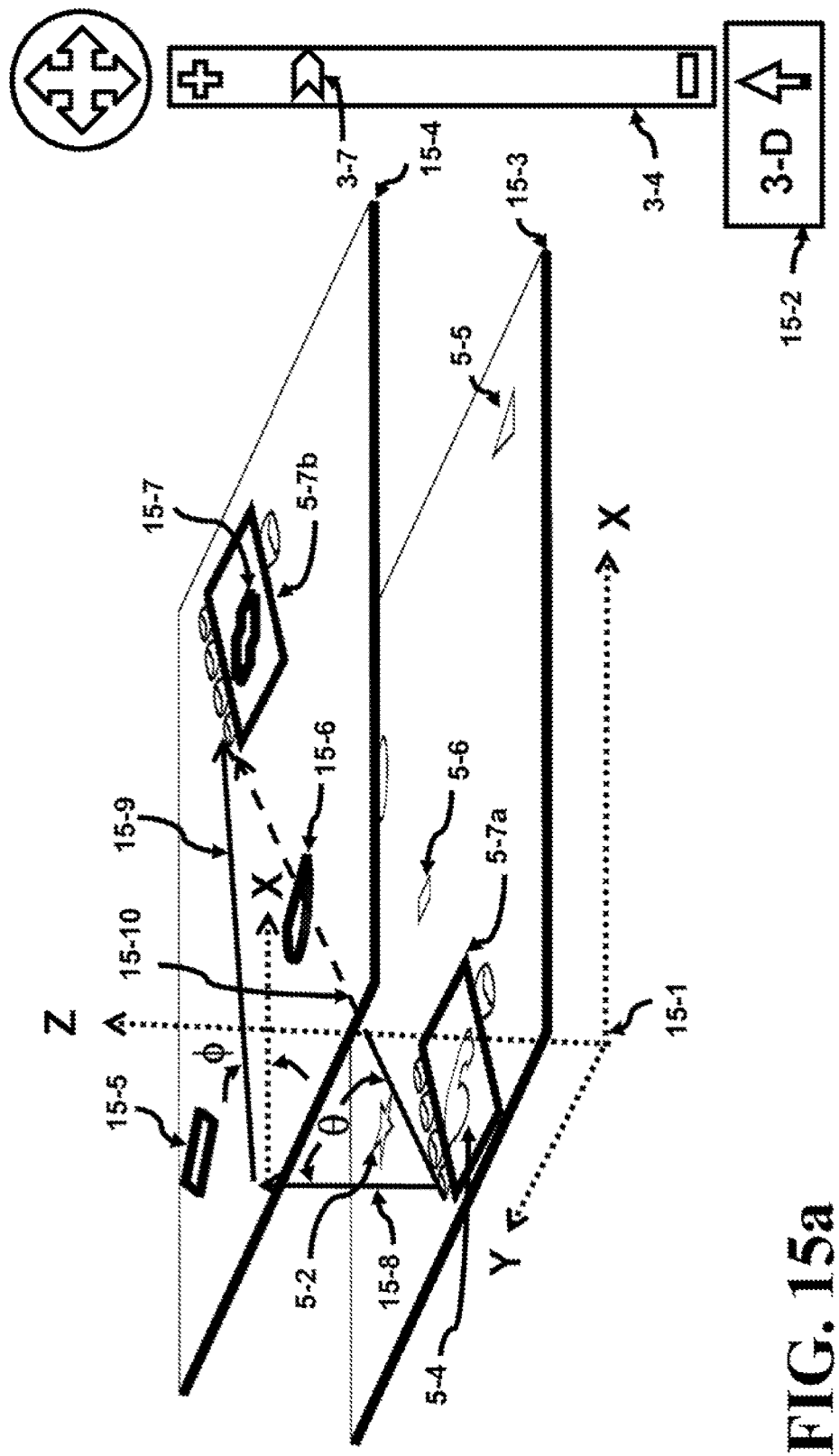
FIG. 15a shows a 3-D representative map where a Z-axis direction is added to the X and Y-axes to view the large scale or a first sub-scale portion of the representative map in three dimensions in accordance with the present invention.

FIG. 15a illustrates a 3-D map where the user moves the screen of the portable unit in a stationary map that is three dimensional. The plane 15-3 can be selected as a reference plane. The X, Y and Z axes 15-1 show that the user maintains the screen of the portable unit parallel to the X-Y plane. In addition, the direction of the X axis determines the reference 0° angle in this plane. Other possibilities allow the screen in the XZ or YZ planes and for that matter, at any orientation with respect to the three axes. Below the scale 3-4 is the 3-D identifier 15-2 with an arrow moving upwards: This would correspond to the path of movement in the vector 15-8. The slider 3-7 is set to the same magnification as in the screen of the portable unit shown in FIG. 13b and beneath the scale is the 3-D identifier 15-2. The reference plane 15-3 is equivalent to the map presented in FIG. 13a. This plane shows the star 5-2, the object 5-4, the triangle 5-5 and the rectangle 5-6. The screen of the portable unit 5-7a is displaying the object 5-4. After the perpendicular motion 15-8, the user is now on plane 15-4 which contains a rectangle 15-5, a pie shape 15-6 and a cross 15-7. The user moves the portable unit along the vector 15-9 to display on the screen of the portable unit 5-7b the cross 15-7 and its local vicinity. The overall distance that the unit has moved is illustrated by the vector 15-10. This vector has a distance, the magnitude of 15-10, associated with the three dimension space. This vector 15-10 is positioned at an angle φ (phi) from the X-axis and at an angle Θ (theta) from the Z-axis, thus, providing the spherical coordinates for the movement.

Figure 15B:
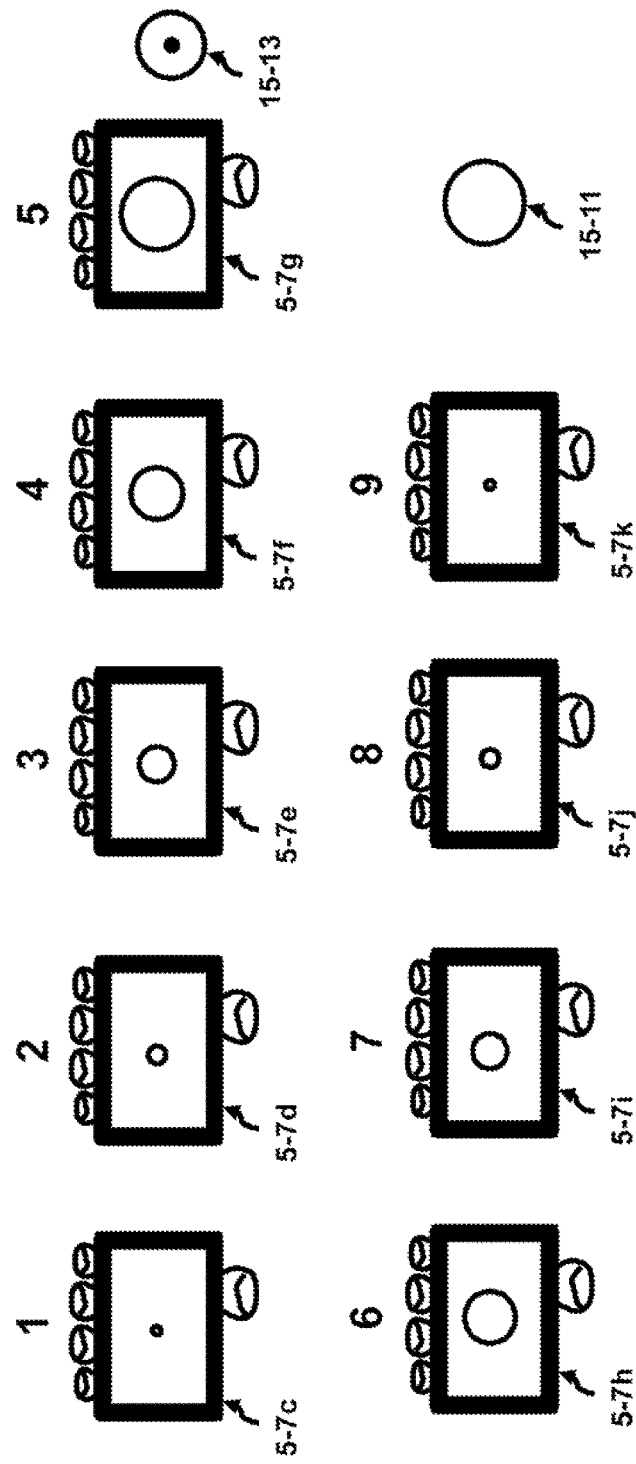
FIG. 15b presents the progress in the positive Z-axis direction of an image show to the user in slices in accordance with the present invention.

FIG. 15b illustrates the screen nine (9) views of different planes on the screen of the portable unit 5-7c through 5-7k. According to the transparent head of the arrow 15-13, the portable unit is being, moved towards the user or out of the page. Due to the movement of the portable unit, each plane presents a cross sectional view of the object. The head is transparent to allow the object (or map) behind the head to be viewed. These views are presented when the unit is moved perpendicular to the plane of the page. These images presented need to be combined mentally by the user to visualize that the object being viewed is a sphere 15-11. The solid image is effectively determined by a summation of all the cross sections of the object as the user moves perpendicular to the screen. If the user cannot guess what the object is, then the unit can present an image of a sphere.

Figure 15C:
FIG. 15c depicts the movement away from the user by showing the tail (feathers) of the arrow in accordance with the present invention.
Figure 15D:
FIG. 15d presents the movement towards from the user by showing the head (point) of the arrow in accordance with the present invention.

FIG. 15c shows the movement away from the user by the downwards arrow labeled "9 to 1". The label means that the user is looking at 9, 8, 7 . . . to 1 in secession in FIG. 15b causing the portable unit to move away from the user; thus, the transparent tail 15-12 (or the feathers) of the arrow would be visible to the user. The tail is transparent to allow the object (or map) behind the tail to be viewed. FIG. 15d shows the movement towards the user by the upwards arrow labeled "1 to 9". The label means that the user is looking at 1, 2, 3 . . . to 9 in secession in FIG. 15b causing the portable unit to move toward the user; thus, the head 15-13 (or the point) of the arrow would be visible to the user. Both the tail 15-12 and head 15-13 are visible on the screen and are transparent.

The transparent tail and head can indicate to the user how far above or below a reference plane the current view on the screen of the portable unit is. As the user moves away from the reference plane, the diameter of the transparent head or tail can be made proportional to the distance above or below the reference plane. For a three dimensional display, the transparent head and tail symbols along with the projected transparent arrow on the plane of the screen, the user can follow the arrow to move to the correct planar location and then use the head or tails symbol to alter the depth or height above the plane corresponding to the screen to locate a missing object or location.

FIG. 16a-c illustrates other distance and movement measuring devices and procedures. FIG. 16a illustrates transceivers 16-1, 16-2 and 16-3 placed in the local environment. These transceivers initialize their interface by emitting signals 16-4, 16-5 and 16-6 and receiving the bi-directional signals 16-4, 16-5 and 16-6 from these transceivers to determine a relative position of each transceiver with respect to the other. Then, in FIG. 16b, a portable unit 5-7 enters the environment and sends signals 16-7, 16-8 and 16-9 between the portable unit 5-7 to the transceivers 16-1, 16-2 and 16-3 to determine the relative position of the unit. This information is used by the unit 5-7 to determine the amount of movement, either with or without an interaction with the inertial guidance system. FIG. 16c illustrates an addition of an external processor 16-16 to aid in the calculation. In FIG. 16c, a portable unit 5-7 enters the environment and sends signals 16-7, 16-8 and 16-9 from the portable unit 5-7 to the transceivers 16-13, 16-14 and 16-15. The transceivers 16-13, 16-14 and 16-15 send their results 16-10, 16-11 and 16-12 to the processor 16-16 to determine the relative position of the unit. The processor then sends a signal 16-17 to the portable unit 5-7 to provide the relative displacement of the unit. The signal can contain a wavelength or a short duration of energy that can be monitored and measured which indicates time of flight of the signal. The signal can be RF, audio, light or any other form of electromagnetic radiation. For example, ultra-sound can be used to measure the distance of the back of the portable unit to the closest obstruction. As the user moves the portable unit away or toward the obstruction, the Z-axis values is altered in a three dimension system. This distance is used to present the different planes within the three dimensional solid being viewed on the screen.

Figure 17:
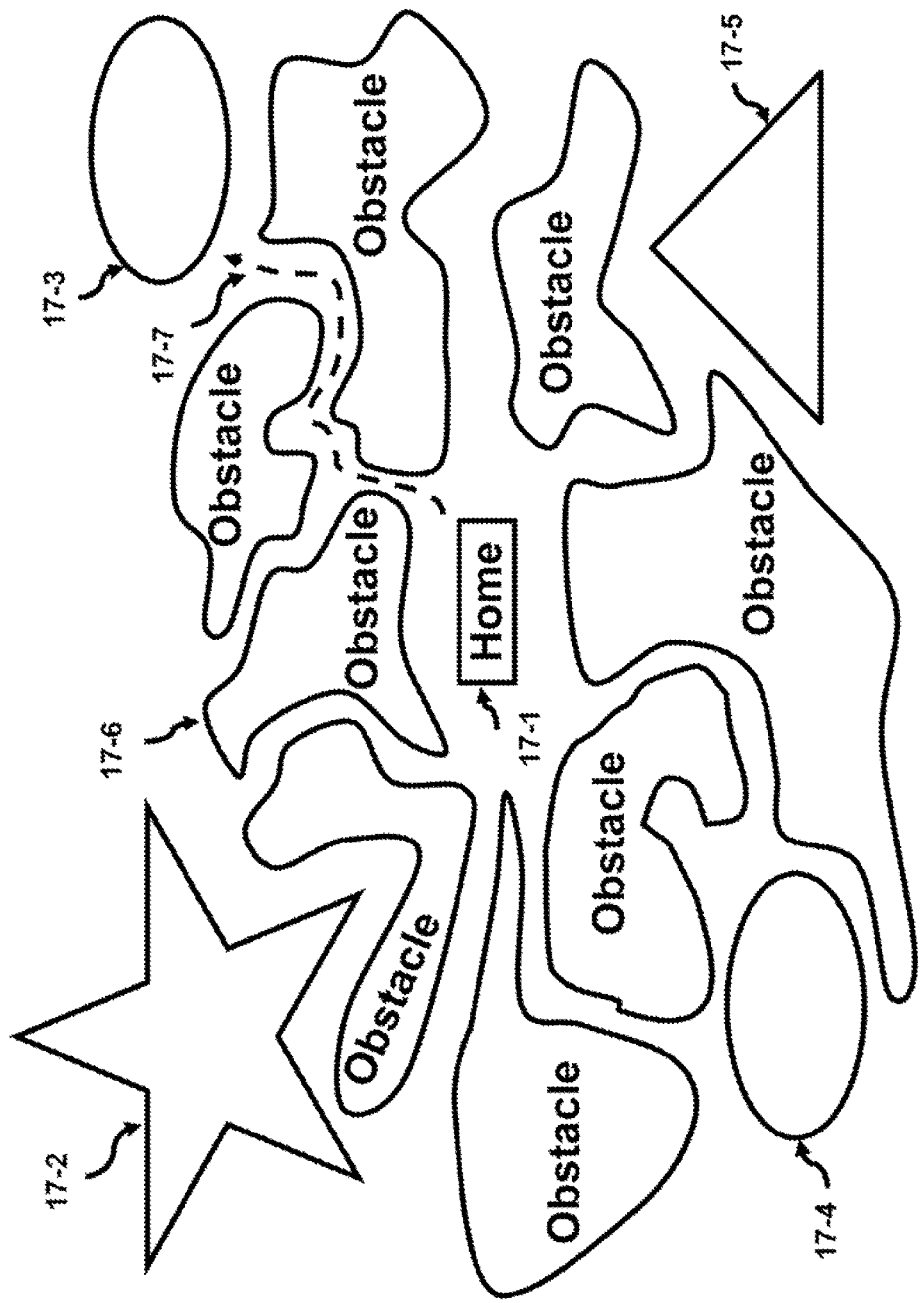
FIG. 17 shows a hand held device used in an application to avoid obstacles in attaining points in accordance with the present invention.

FIG. 17 depicts a 3-D space where the user can choose to remain on the same plane or move between planes. The goal is to get from home 17-1 to the star 17-2, the first oval 17-3, the second oval 17-4 or the triangle 17-5 without contacting any of the obstacles. The movement could be performed by moving the unit or by moving the map. This maze or puzzle can be a 2-D or 3-D game.

Finally, it is understood that the above description are only illustrative of the principle of the current invention. Various alterations, improvements, and modifications will occur and are intended to be suggested hereby, and are within the spirit and scope of the invention. This invention may, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. The microprocessor is a device that is used to calculate the distance that the portable device moves and to interact with the database in the memory to provide the data corresponding to the new portion of the map associated with the distance change. The data from the memory is translated into display data by the processor. The microprocessor could also be a DSP or video processor. In accordance with these principles, those skilled in the art may devise numerous modifications without departing from the spirit and scope of the invention. The three dimensional space can contain detailed maps, objects, solids, floor plans, cities, underground pipelines, etc.

What is claimed is:

1. A portable unit comprising:
a memory configured to store a map mapped within a three dimensional space;
a first plane selected within the three dimensional space;
a plurality of locations selected within the three dimensional space of the map, the plurality of locations that are selected are each marked with a location marker, some of the plurality of locations are located on a first side of the first plane, and all remaining plurality of locations are located on a second side of the first plane;
an image of the map is displayed on a screen of the portable unit, the image corresponds to the first plane within the three dimensional space, wherein none of the plurality of locations selected are visible in the image displayed on the screen; and
each one of the plurality of locations marked with the location marker have a corresponding transparent arrow displayed on the screen pointing to their location marker, if the transparent arrow is a tail, the tail indicates that the transparent arrow points to the location markers located on the first side of the first plane, and if the transparent arrow is a head, the head indicates that the transparent arrow points to the location markers located on the second side of the first plane.

2. The portable unit of claim 1, wherein
the diameter of each transparent arrow is proportional to the distance that the corresponding location marker is displaced from the first plane.

3. The portable unit of claim 1, wherein
each location marker can be selected from the group consisting of letters, numbers, and different shapes placed next to the desired locations to be viewed.

4. The portable unit of claim 1, wherein
each of the plurality of locations is selected by a user.

5. The portable unit of claim 1, wherein
when the portable unit is moved in the direction of either the transparent arrow with the head or the transparent arrow with the tail, the location being pointed to is eventually displayed on the screen.

6. The portable unit of claim 1, further comprising:
an RF module to access an external database to supply the memory with data.

7. A method of locating a plurality of locations comprising the steps of:
storing a map mapped within a three dimensional space into a memory;
selecting a first plane within the three dimensional space;
selecting within the three dimensional space of the map the plurality of locations, the plurality of locations that are selected are each marked with a location marker, some of the plurality of locations are located on a first side of the first plane, and all remaining plurality of locations are located on a second side of the first plane;
displaying an image of the map on a screen of the portable unit corresponding to the first plane within the three dimensional space, wherein at least one of the plurality of locations selected are visible in the image displayed on the screen; and
marking non-visible ones of the plurality of locations with the location marker;
associating each of the non-visible ones of the plurality of locations with a transparent arrow, each transparent arrow is displayed with the image on the screen, the location markers on the first side have their corresponding transparent arrow as a point, the point indicating the transparent arrow is pointing perpendicular from the first plane to its location marker on the first side, the location markers on the second side have their corresponding transparent arrow as a head, and the head indicating the transparent arrow is pointing perpendicular from the first plane to its location marker on the second side.

8. The method of claim 7, wherein
the diameter of each transparent arrow is proportional to the distance that the corresponding location marker is displaced from the first plane.

9. The method of claim 7, wherein
the location markers can be selected from the group consisting of letters, numbers, and different shapes placed near the desired locations to be viewed.

10. The method of claim 7, wherein
each of the plurality of locations is selected by a user.

11. The method of claim 7, wherein
when the portable unit is moved in the direction of either the transparent arrow with the head or the transparent arrow with the tail, the location being pointed to is eventually displayed on the screen.

12. The method of claim 7, further comprising the steps of:
accessing an external database with an RF module to supply the memory with data.

13. A portable unit comprising:
a map mapped within a three dimensional space;
a first plane selected within the three dimensional space;
a plurality of locations selected within the three dimensional space of the map, the plurality of locations that are selected are each marked with a location marker, some of the plurality of locations are located on a first side of the first plane, and the rest of the plurality of locations are located on a second side of the first plane;
an image of the map is displayed on a screen of the portable unit, the image corresponding to the first plane within the three dimensional space, wherein none of the plurality of locations selected are visible in the image displayed on the screen; and each one of the plurality of locations marked with the location marker and is identified with a transparent arrow, each of the transparent arrows are displayed on the screen, the transparent arrows with a point, point perpendicular from the first plane into the first side to their corresponding location marker, and the transparent arrows with a head, point perpendicular from the first plane into the second side to their corresponding location marker.

14. The portable unit of claim 13, wherein the diameter of each transparent arrow is proportional to the distance that the corresponding location marker is displaced from the first plane and when the portable unit is moved in the direction of either the transparent arrow with the head or the transparent arrow with the tail, the location being pointed to is eventually displayed on the screen.

15. The portable unit of claim 13, further comprising:
a memory configured to store an image of the map; and
an RF module configured to access an external database to supply the memory with data.

16. The portable unit of claim 13, wherein
each of the plurality of locations is selected by a user.

* * * * *